Dec. 31, 1935.       A. F. HOWE       2,026,040
MACHINE FOR MANUFACTURING WOOD HEELS FOR SHOES
Filed Dec. 18, 1931       11 Sheets-Sheet 2
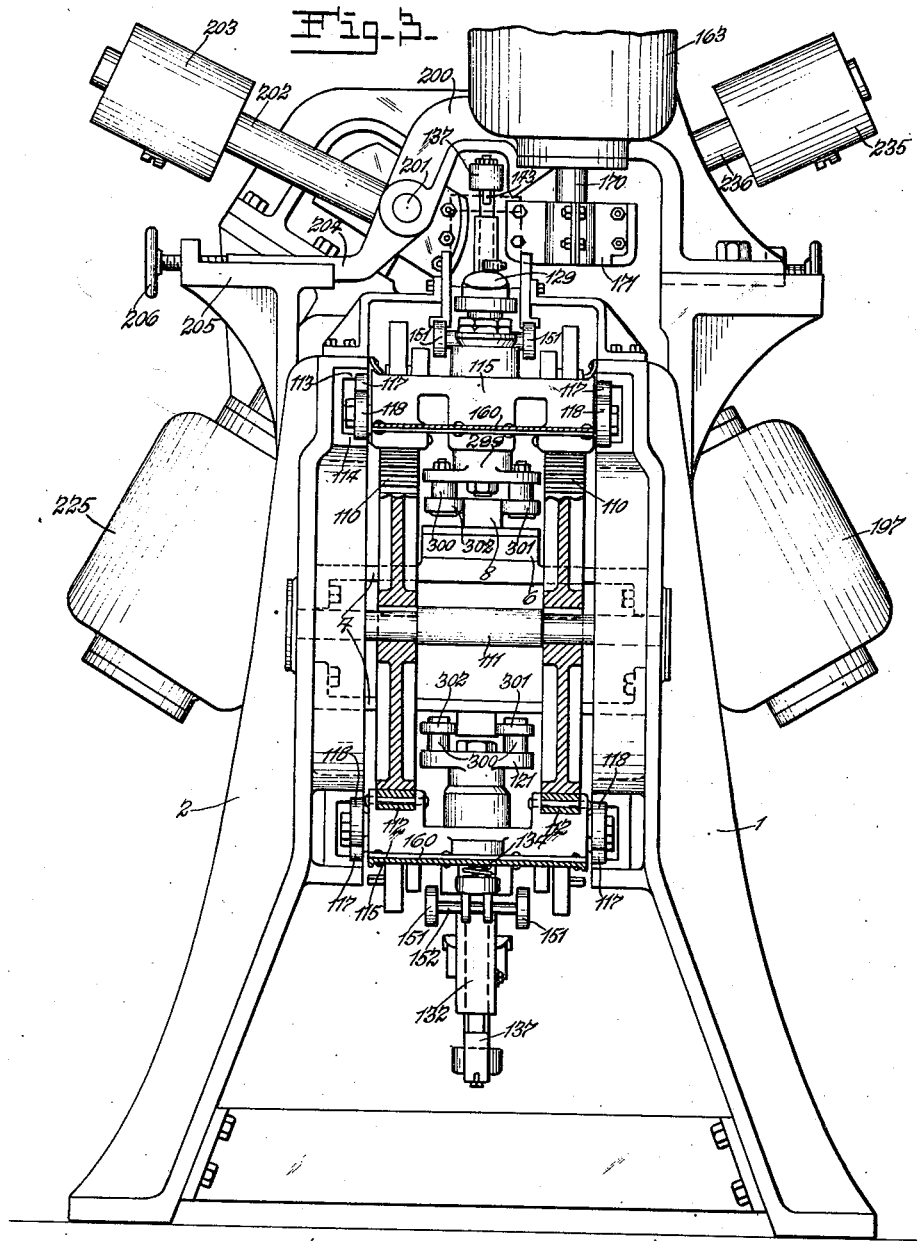
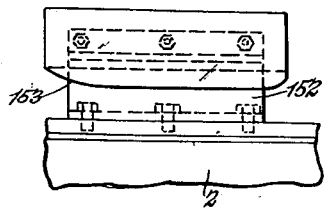
Inventor
Andrew F. Howe
by Rippey & Kingsland
His Attorneys

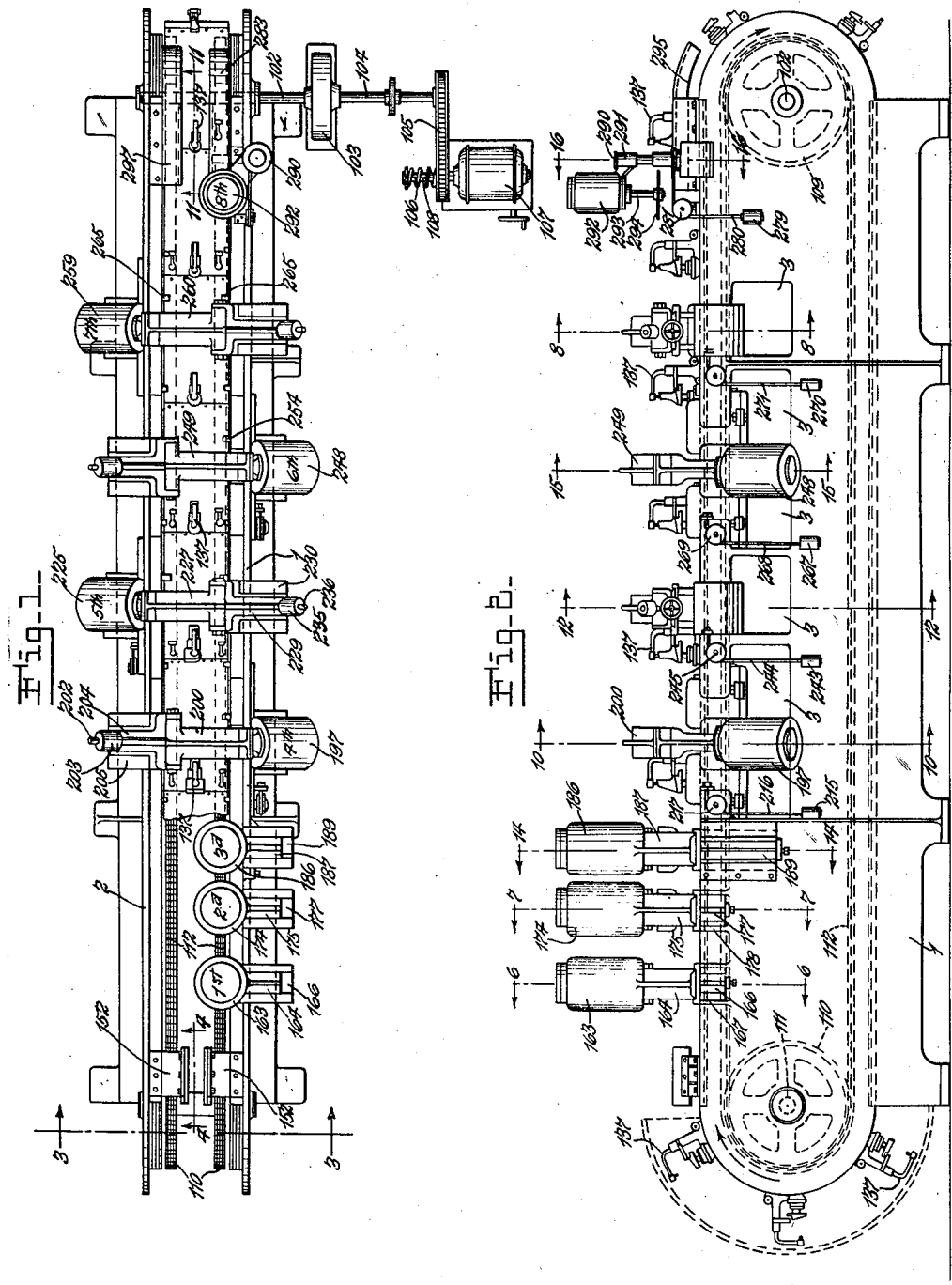

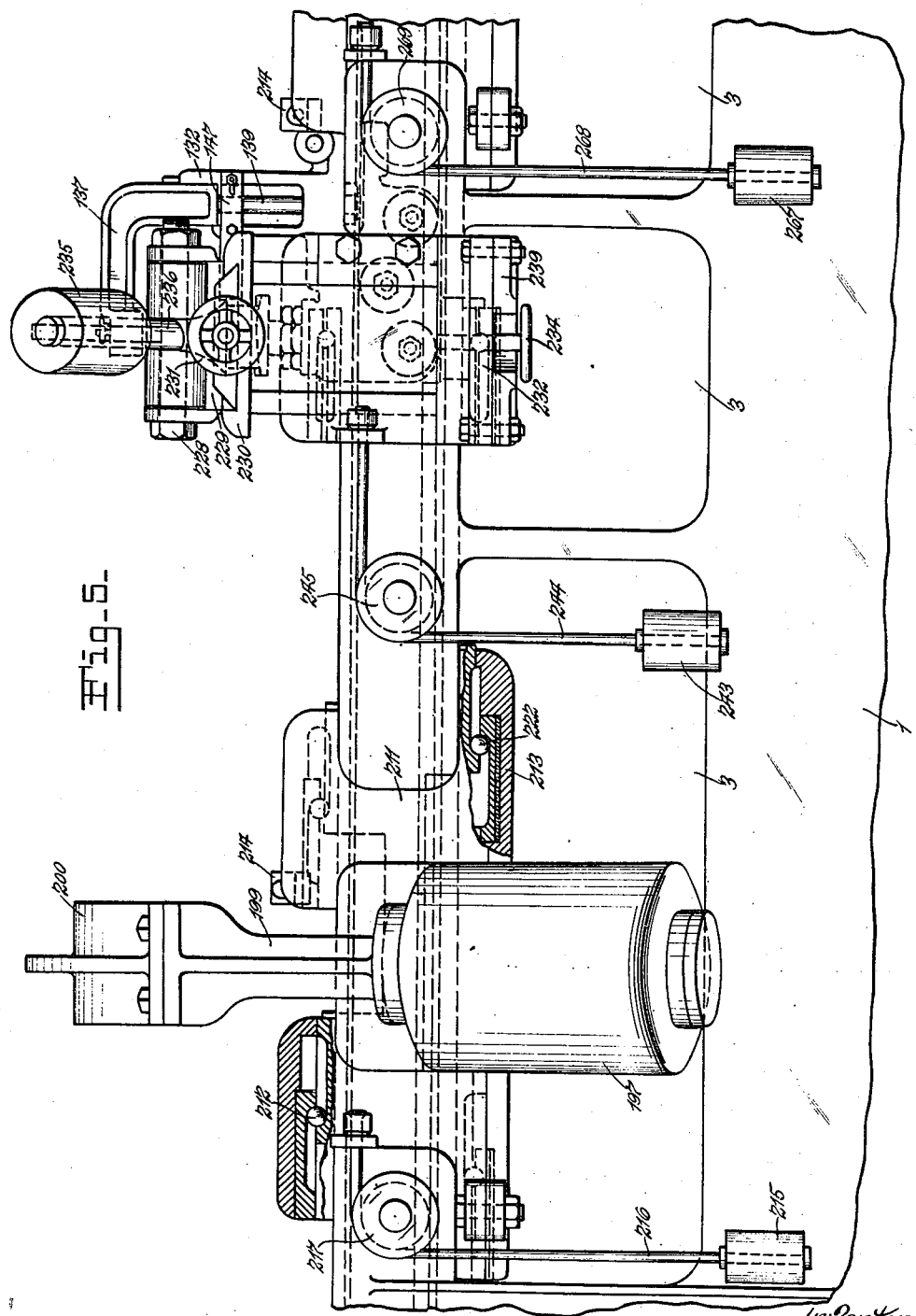

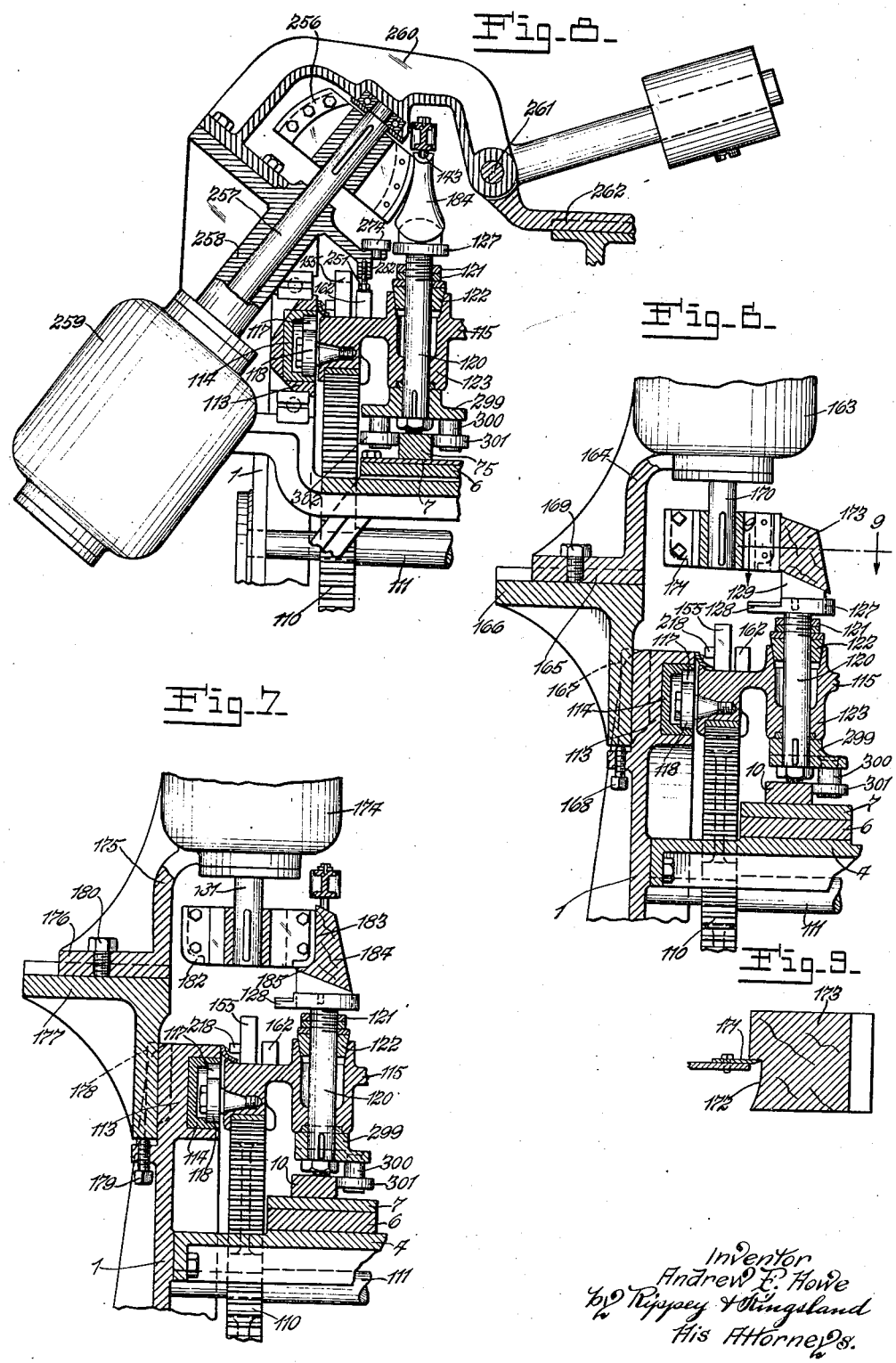

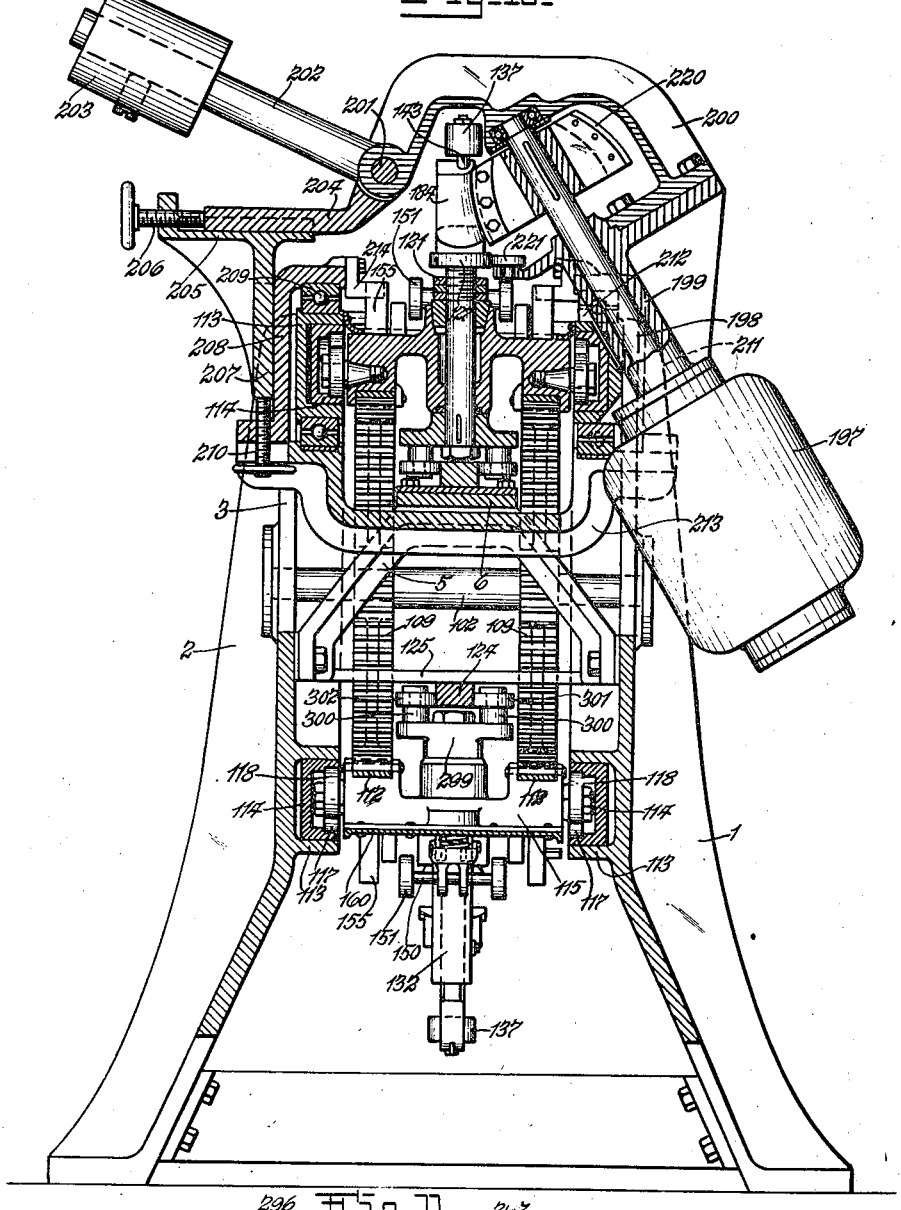

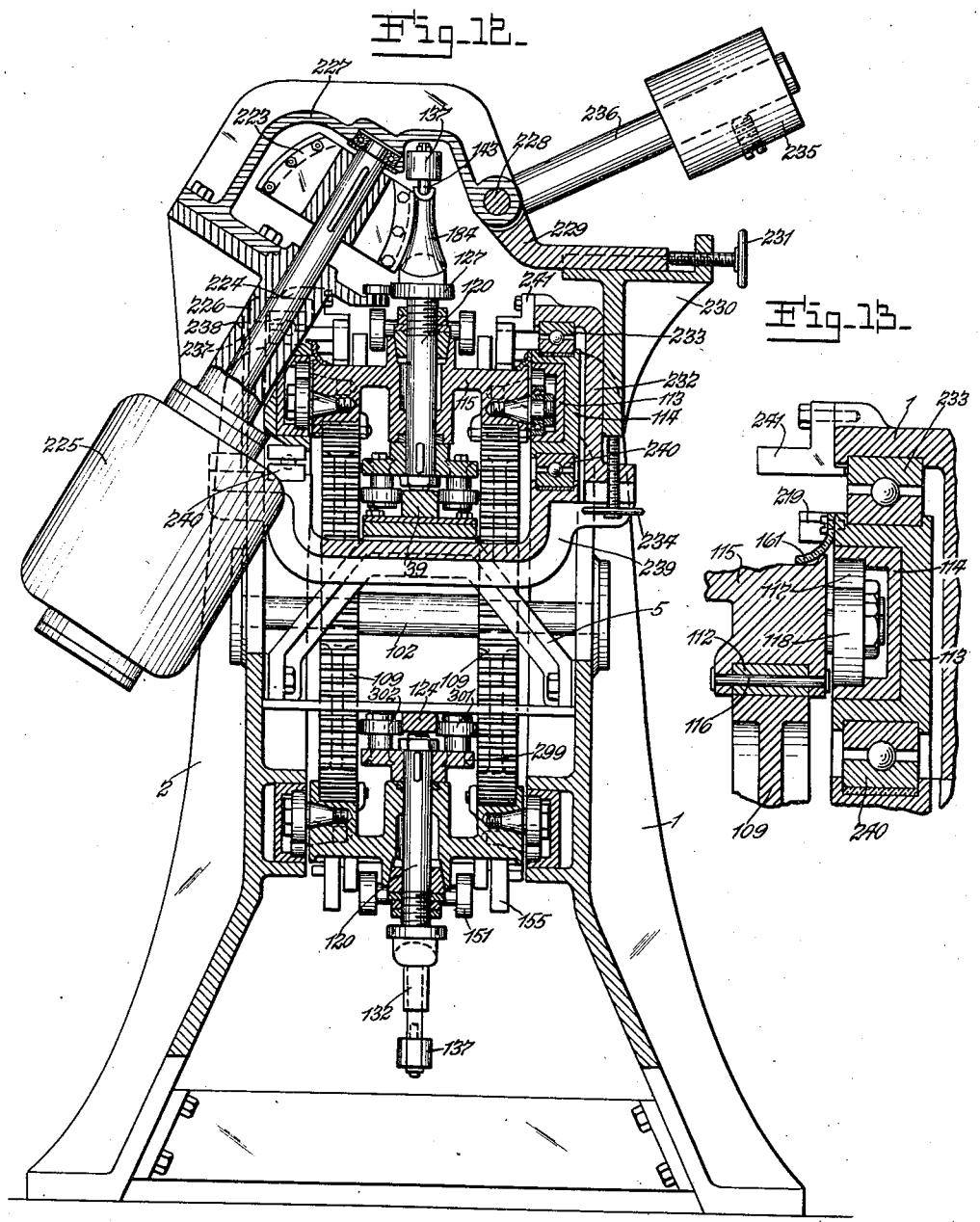

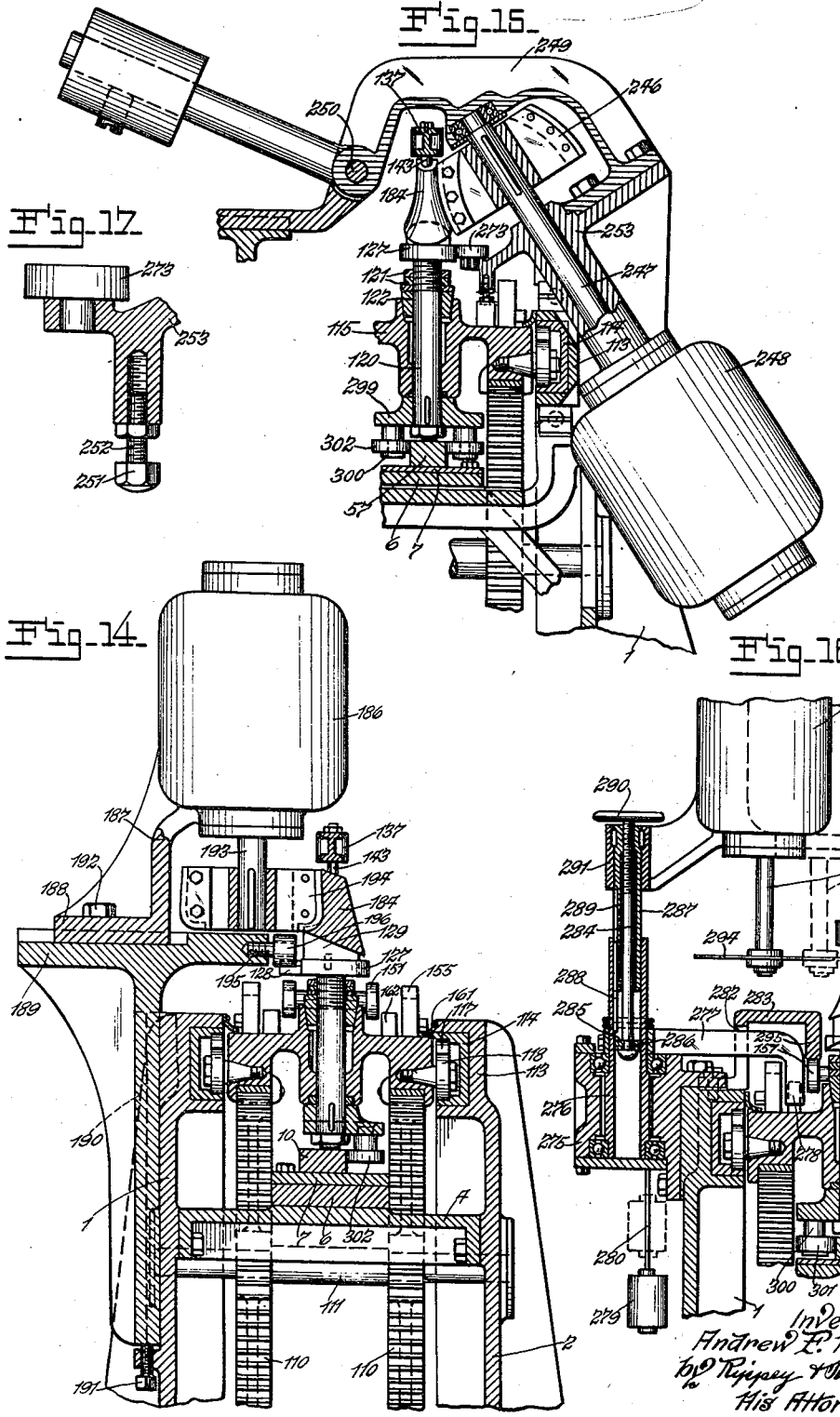

Dec. 31, 1935.　　　A. F. HOWE　　　2,026,040
MACHINE FOR MANUFACTURING WOOD HEELS FOR SHOES
Filed Dec. 18, 1931　　11 Sheets-Sheet 8
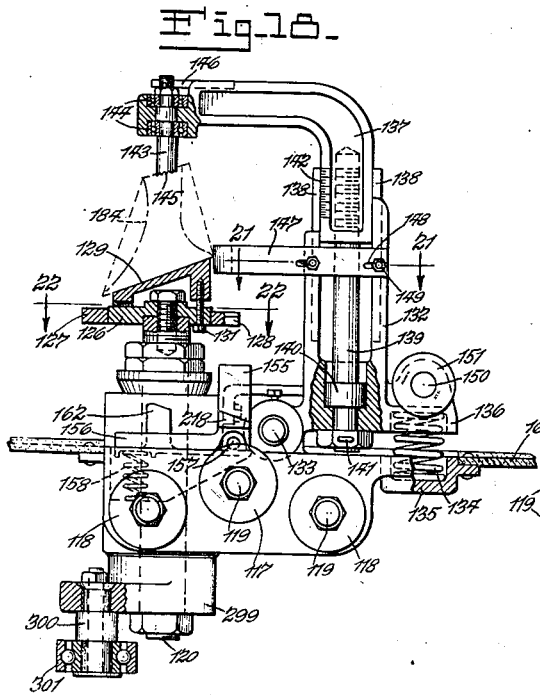
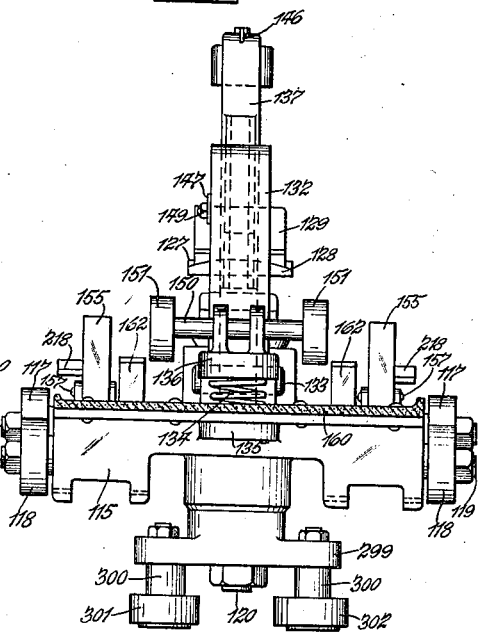
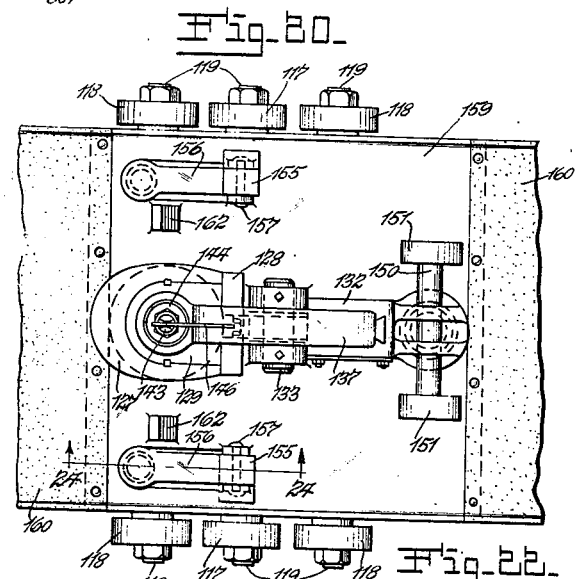
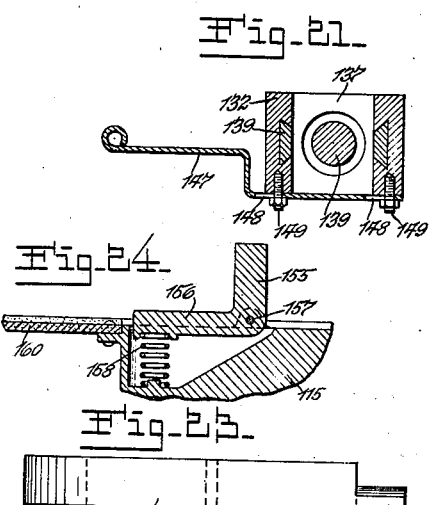
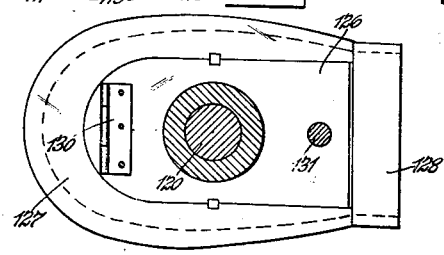

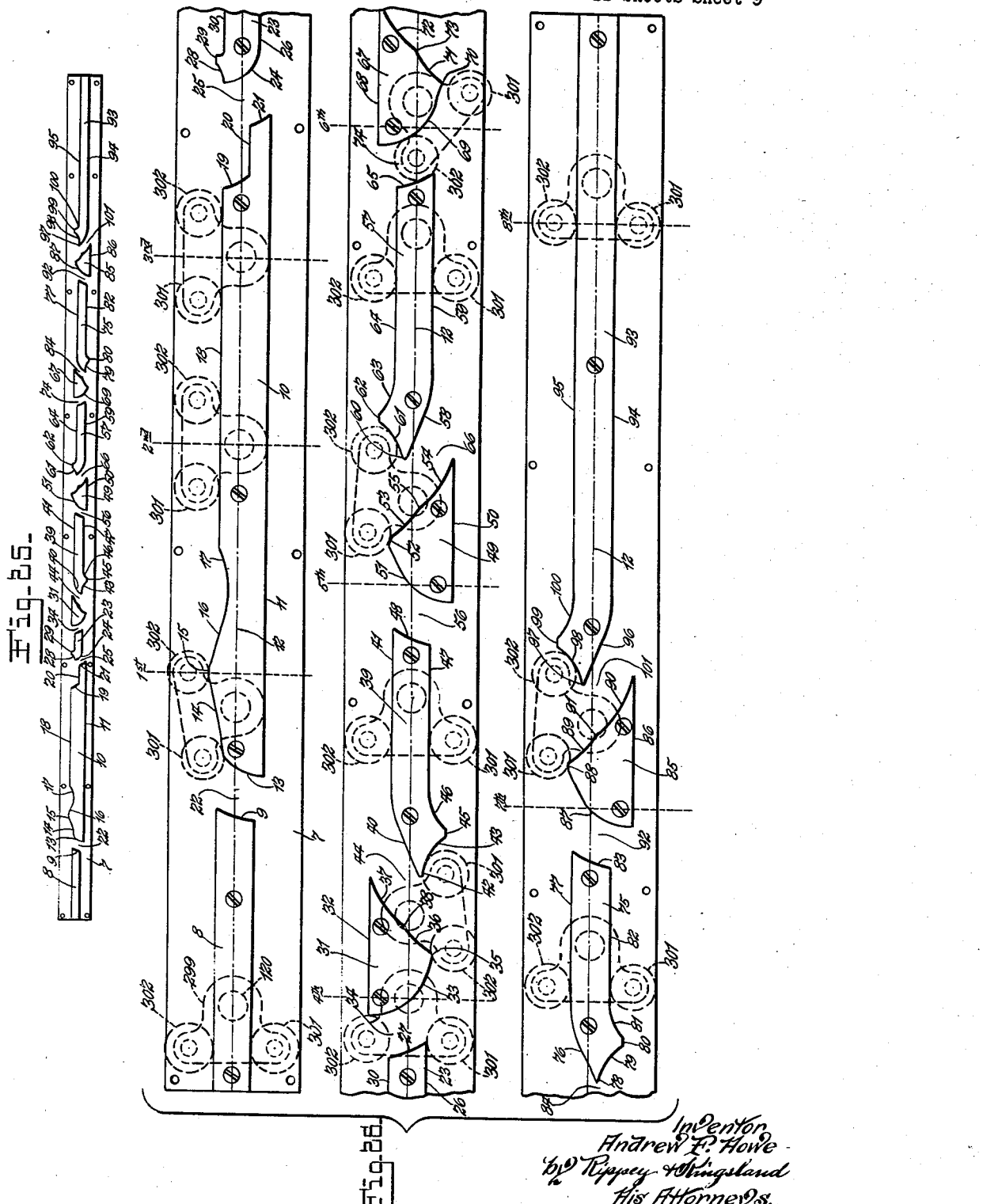

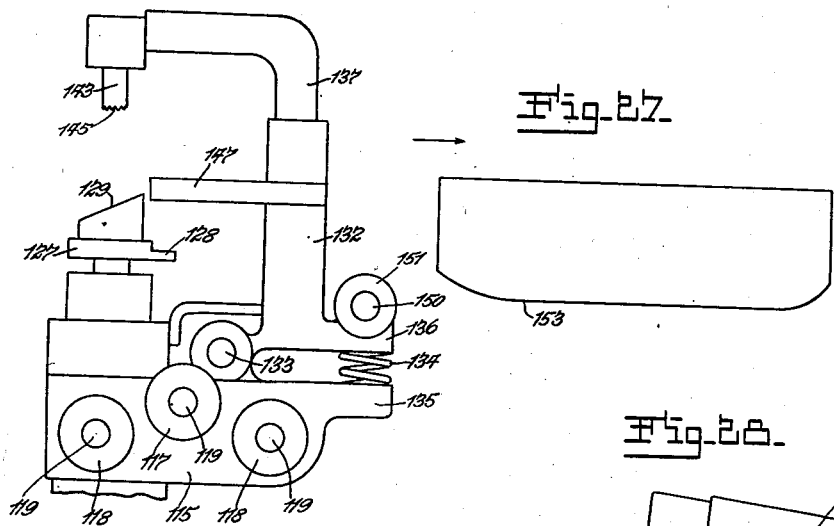

Dec. 31, 1935.  A. F. HOWE  2,026,040
MACHINE FOR MANUFACTURING WOOD HEELS FOR SHOES
Filed Dec. 18, 1931   11 Sheets-Sheet 11
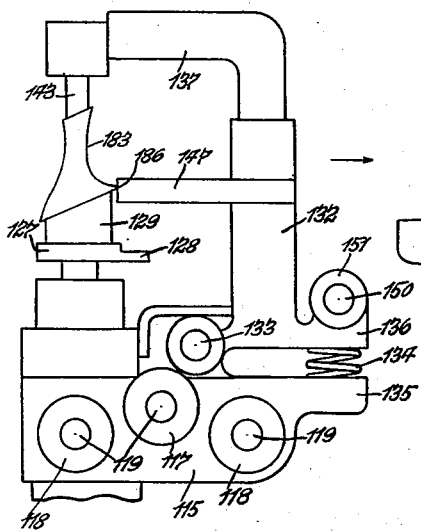
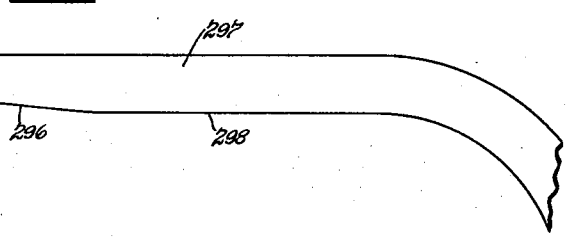
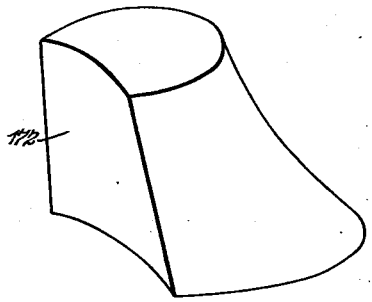
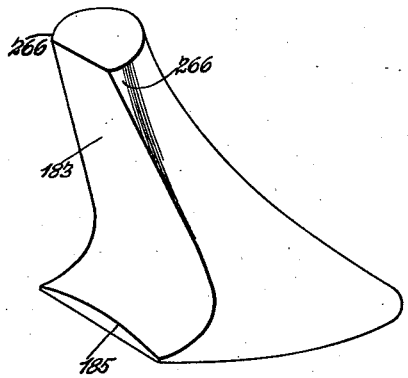
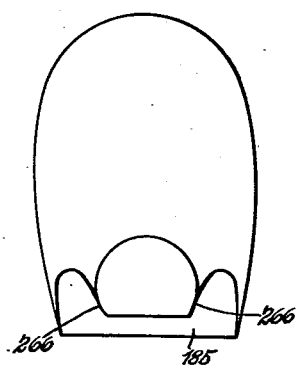
Inventor
Andrew F. Howe
by Rippey & Kingsland
His Attorneys Patented Dec. 31, 1935

2,026,040

UNITED STATES PATENT OFFICE 2,026,040

MACHINE FOR MANUFACTURING WOOD HEELS FOR SHOES

Andrew F. Howe, University City, Mo., assignor to United Wood Heel Company, St. Louis, Mo., a corporation of Delaware Application December 18, 1931, Serial No. 581,933

110 Claims. (Cl. 12—42)

This invention relates to machines for manufacturing wood heels for shoes.

Heretofore in the manufacture of wood heels for shoes, it has been the usual or universal practice arising from necessity to operate upon the blanks from which the wood heels are constructed by passing the blanks through different machines and subjecting the blanks to the operations of different machines. This has required the successive placement of the blanks in and removal of the blanks from the several machines. In these operations, it has been necessary to exercise care at the sacrifice of considerable time in order that the blanks might be located as accurately and precisely as possible for the operations of the knives or other cutting devices by which the blanks were shaped into heels. For many reasons, it has been practically impossible to locate the blanks with the required accuracy and precision, so that all of the heels made therefrom will be of uniform construction and acceptable for use. Additionally, by these successive placements and removals of the blanks in and from different machines, a large percentage of the blanks have been damaged and spoiled. Accordingly, it has required considerable time and involved considerable loss of material to manufacture wood heels by the usual existing practices with the further objection that the wood heels were not uniform.

Objects of the present invention are to provide an improved machine for manufacturing and shaping wood heels from blanks by continuous operation and passage of the blanks through a single machine and subjecting the blanks to the successive operations of different cutting and shaping devices while the blanks are held clamped in the same support. This avoids the successive placement and removal of the blanks and holds the blanks firmly and rigidly clamped, so that all blanks will be operated upon uniformly and the heels produced will be of almost unfailing uniform shape. This also prevents the blanks from being damaged or broken on account of improper adjustment of the blanks in clamping supports.

Another object of the invention is to provide a machine for the manufacture of wood heels, including movable carriages having clamping devices therein, and a series of cutting and shaping devices to the action of which the blanks are successively subjected when the blanks are moved along and through the machine by the movement of the movable carriages in which the blanks are mounted.

Another object of the invention is to provide an improved machine of the type and character mentioned operative first to cut and shape the breast walls of the blanks and thereafter successively to cut and shape the outer walls of the blanks in order to produce heels of selected designs and shapes.

A further object of the invention is to provide a machine of the type and character mentioned in the last preceding statement of object, in combination with mechanism for cutting the top end portion of the blank to produce the finished heels after the breast wall and outer walls have been formed.

Another object of the invention is to provide an improved machine for forming wood heels comprising one or more movable carriages having clamping devices therein, mechanism for moving the carriage or carriages along or through the machine adjacent to cutting devices for forming the breast walls of the heels and other cutting devices for forming the outer walls of the heel, and mechanism for operating the clamping devices so as to subject the breast and outer walls of the heels to the action of the cutting devices.

Various other objects of the invention will appear from the following description read in connection with the annexed drawings, in which—

Fig. 1 is a plan view of a machine embodying the present invention.

Fig. 2 is a side elevation of the machine.

Fig. 3 is an enlarged vertical cross sectional view of the machine approximately on the line 3—3 of Fig. 1.

Fig. 4 is an enlarged sectional view on the line 4—4 of Fig. 1.

Fig. 5 is an enlarged side elevation with parts in section of an intermediate portion of the machine.

Fig. 6 is an enlarged vertical sectional view on the line 6—6 of Fig. 2 showing a heel blank for making a heel of the Cuban type mounted in the machine.

Fig. 7 is an enlarged vertical sectional view approximately on the line 7—7 of Fig. 2 showing a heel blank for making a Louis heel mounted in the machine and the cutter forming the breast wall.

Fig. 8 is an enlarged vertical sectional view approximately on the line 8—8 of Fig. 2 showing a Louis heel blank being operated upon by the cutter shaping and forming the outer walls of the heel.

Fig. 9 is an enlarged cross sectional view on the line 9—9 of Fig. 6.

Fig. 10 is an enlarged vertical cross sectional view approximately on the line 10—10 of Fig. 2 showing the mechanism for shaping the opposite portion of the outer wall of the heel blank.

Fig. 11 is an enlarged sectional view approximately on the line 11—11 of Fig. 1.

Fig. 12 is an enlarged vertical cross sectional view approximately on the line 12—12 of Fig. 2 showing a cutter operating upon the heel blank and performing the finishing operations for portions of the outer wall.

The cutting devices shown in Figs. 10 and 12 are operative to work upon both Cuban and Louis heels.

Fig. 13 is an enlarged sectional view showing the mounting for the carriage supports in which the carriages that support the heel blanks are mounted.

Fig. 14 is an enlarged vertical sectional view approximately on the line 14—14 of Fig. 2 showing the formation of the breast wall of a Louis heel.

Fig. 15 is an enlarged vertical sectional view approximately on the line 15—15 of Fig. 2 showing the position of the cutters in finishing an outer wall surface of a Louis heel.

Fig. 16 is an enlarged sectional view approximately on the line 16—16 of Fig. 2 showing the cutter for cutting off the top end of any heel as required after the heel has been otherwise completed.

Fig. 17 is a sectional view showing one of the cutter control devices whereby the cutters spool the breast edges of the heel.

Fig. 18 is a side elevation with parts in section of one of the carriages in which the heel blanks are mounted.

Fig. 19 is an end elevation of said carriage.

Fig. 20 is a plan view of said carriage.

Fig. 21 is a sectional view on the line 21—21 of Fig. 18 showing the adjustable clamp support and the resilient setting guide for the heel blank.

Fig. 22 is a sectional view on the line 22—22 of Fig. 18 showing a guide member for controlling the shape and extent of cutting performed on the outer walls of the heel blanks by the cutters.

Fig. 23 is a side elevation of said guide member.

Fig. 24 is a sectional view on the line 24—24 of Fig. 20.

Fig. 25 is a reduced plan view of the series of cams whereby the supports for the heel blanks are operated to present and subject the blanks properly and successively to operation of the cutting devices to cut first the breast wall of the heel and then by successive operations of different cutting devices to cut the outer walls of the heel.

Fig. 26 is a composite enlarged view of the cams.

Fig. 27 is a diagrammatic view showing in side elevation one of the heel blank supporting carriages and one of the cams for opening or releasing the clamping device, to permit placement of a heel blank, automatically and as an incident to the travel of the carriage.

Fig. 28 is a side elevation of the carriage having the blank clamping device held in open or released position by the releasing members.

Figs. 29, 30 and 31 are views showing elements on the heel carriage in different positions with respect to parts on the cutting device carriages whereby the heel carriage moves the cutting carriages predetermined distances.

Fig. 32 is a view showing the heel supporting carriage adjacent to a releasing member whereby the finished heel is released from the clamping device in said carriage.

Fig. 33 is a perspective view of a Cuban heel manufactured by this machine by operation of the 1st, 4th, 5th and 8th cutting devices.

Fig. 34 is a perspective view of a Louis heel manufactured by this machine by operation of all of the cutting devices other than the 1st.

Fig. 35 is a view looking toward the lower end of a Louis heel made by this machine.

The machine comprises two upright horizontally elongated frames 1 and 2. Each of these frames has in its upper intermediate portion a number of holes 3 (Figs. 2 and 5). Beyond the holes 3, the frames 1 and 2 are rigidly connected by transverse horizontal bars 4 (Fig. 3) and are rigidly connected at intervals by upwardly extending brackets 5 having their ends attached to the frames 1 and 2 below the holes 3 and having their upper portions in the same horizontal plane with the upper portions of the bars 4 (Fig. 10). An elongated plate 6 is rigidly supported on the bars 4 and the brackets 5 and said plate 6 rigidly supports a cam plate 7. Thus, the plates 6 and 7 are rigid with each other and with the supporting members 4 and 5.

The cam plate 7 rigidly supports a longitudinal series of cams detailed in Figs. 25 and 26. These cams extend upwardly from the plate 7. At the forward end of said plate 7, there is a cam 8 having straight parallel sides and terminating at its inner end at a curved wall 9.

The next cam comprises a member 10 having a straight side edge 11 spaced farther from the median line 12 than the adjacent side edge of the cam 8. The end of the cam member 10 that is toward the cam member 8 has a rounded wall 13 curving to continuation with a straight laterally inclined cam wall 14 leading to a cam point 15 that is spaced farther from the median line 12 than is the corresponding side wall of the cam 8. From the cam point 15 a cam wall 16 inclines inwardly toward the median line 12 and then curves outwardly to form an outwardly inclined wall 17 leading to intersection with the straight side wall 18 of the cam member 10. The side wall 18 has at its inner end an inwardly curved cam wall 19 that is intersected by a straight cam wall 20 spaced beyond the median line 12 from the side wall 18. The cam side wall 11 and the cam wall 20 intersect a curved wall 21 at the end of the cam member 10. Thus, there is a space 22 between the adjacent ends of the cam members 8 and 10.

The next adjacent cam member 23 has a curved end 24 separated from the curved end 21 by a space 25. The side wall 26 of the cam member 23 extends from its intersection with the curved wall 24 to intersection with the opposite inwardly curved wall 27 of said cam member 23. The end of the cam member 23 that is toward the cam member 10 is formed with a laterally extended cam portion 28 having a point 29 extending laterally beyond the side wall 30 of the cam member 23. The side walls 26 and 30 of the cam member 23 are spaced from the median line 12 about the same distance as are the side walls of the cam member 8.

The next cam member 31 of the series is substantially triangular in plan view having a straight side wall 32 spaced from the median line 12 to about the same extent that the cam point 29 is spaced from the line 12; and having an outwardly curved end wall 33 separated from the curved end wall 27 by a space 34 and extending to a point 35 from which an inwardly curved wall 36 extends to intersection with another inwardly curved wall portion 37 forming a slightly raised cam point 38. The cam point 35 is spaced from the median line 12 about the same distance as the side wall 11 of the cam member 10 and a greater distance than the side wall 26 of the cam member 23.

The next cam member 39 of the series has a curved wall 40 extending from the straight side wall 41 to a cam point 42 formed by intersection of the wall 40 with an inwardly curved wall 43 at the end of the cam member 39. The cam point 42 extends toward the cam member 31 and is separated therefrom by a space 44. The cam point 42 is on the opposite side of the median line 12 from the wall 41. The wall 43 extends to a cam point 45 from which a wall 46 extends to intersection with a straight side wall 47. The side walls 41 and 47 are spaced from the median line 12 about the same distance as are the side walls 26 and 30 of the cam member 23. The walls 41 and 47 extend to intersection with an inwardly curved end wall 48.

The next cam member 49 of the series is approximately the same as the cam member 31 arranged in reverse position. Accordingly, the cam member 49 has a straight side wall 50 spaced from the opposite side of the median line 12 about the same distance as the cam wall 32. A curved end wall 51 extends from the wall 50 to a cam point 52 spaced from the line 12 about the same distance as the cam point 35. From the cam point 52 an inwardly curved wall 53 extends to intersection with another inwardly curved wall 54, said walls forming a slightly extended cam point 55. The curved wall 51 is separated from the curved end wall 48 by a space 56.

The next cam member 57 of the series is a duplicate of the cam member 39 reversed having a curved wall 58 extending from a straight side wall 59 to a cam point 60. From the cam point 60 a curved wall 61 extends to a cam point 62 from which a curved wall 63 extends to a straight side wall 64. The side walls 59 and 64 extend to intersection with an inwardly curved end wall 65. The cam point 60 is on the opposite side of the median line 12 from the cam point 42 and the cam point 62 is on the opposite side of said line from the cam point 45. The cam point 60 is separated from the cam member 49 by a space 66.

The next cam member 67 of the series is a duplicate of the cam member 31 and is similarly located and arranged. The straight side wall 68 is intersected by the curved cam wall 69 extending to a cam point 70 from which an inwardly curved wall 71 extends to intersection with another inwardly curved wall 72 and forming therewith a slightly extended cam point 73. The wall 69 is separated from the wall 65 by a space 74. The cam member 67 is arranged in the same relationship to the median line 12 as the cam member 31.

The next cam member 75 of the series is a duplicate of the cam member 39 having a curved wall 76 extending from the straight side wall 77 to a cam point 78 from which an inwardly curved wall 79 extends to a cam point 80. From the cam point 80 a cam wall 81 extends to connection with the straight side wall 82. The side walls 77 and 82 extend to intersection with an inwardly curved end wall 83. The cam member 75 is separated from the cam member 67 by a space 84. The cam member 75 has the same arrangement and relationship to the median line 12 and to the adjacent cam member 67 as the cam member 39 has to said median line 12 and to the cam member 31.

The next cam member 85 of the series is a duplicate of the cam member 49 having a straight side wall 86 from which a curved wall 87 extends to a cam point 88. From the cam point 88 an inwardly curved wall 89 extends to intersection with another inwardly curved wall 90 forming a slightly raised cam point 91. The cam member 85 is separated from the cam member 75 by a space 92. The cam member 85 has the same arrangement and relationship to the median line 12 and to the adjacent cam member 75 as the cam member 49 has to said line 12 and to the cam member 39.

The next and final cam member 93 of the series has two parallel side walls 94 and 95 spaced from the median line 12 about the same distance as the side walls of the cam member 8. The inner end of the cam member 93 has a curved wall 96 extending from the wall 94 to a cam point 97. An inwardly curved wall 98 extends from the cam point 97 to a cam point 99 and an inwardly curved wall 100 extends from the cam point 99 to the wall 95. These parts of the cam member 93 have the same arrangement and relationship to the median line 12 and to the adjacent cam member 85 as have corresponding parts of the cam member 57 to the median line 12 and to the cam member 49. The inner end of the cam member 93 is separated from the cam member 85 by a space 101.

Near the discharge end of the machine, there is a rotary shaft 102 (Fig. 1) rotated through speed regulating gearing 103 by a shaft 104. The shaft 104 is rotated by driving connections 105 from a motor shaft 106 driven by a motor 107. The driving connections 105 are loosely connected to the shaft 106 and are engaged by a spring 108 on said shaft, which spring will yield, if necessary, to permit the motor to rotate without operating the connections 105. A pair of sprocket wheels 109 are attached to the shaft 102 and a similar pair of sprocket wheels 110 are attached to a shaft 111 supported near the opposite ends of the frames 1 and 2.

A sprocket chain 112 engages each wheel 109 and the corresponding wheel 110, so that the pair of sprocket chains 112 are operated simultaneously and at the same speed.

An endless track is supported by each frame 1 and 2. Each of said tracks is an inwardly opening channel comprising an outer channel member 113 and an inner channel member 114.

A series of carriage trucks 115 are connected with the chains 112 by pin members 116 (Figs. 12 and 13), so that said carriage trucks are operated by the chains 112. Each carriage truck has on each side a triangular series of wheels comprising an upper wheel 117 and two lower wheels 118, each of said wheels being mounted on an axle member 119. During travel along the upper portion of the track the wheels 118 roll along the inner track members 114 and during travel along the lower portion of the machine while the carriages are inverted the wheels 117 roll along the lower track members 113 while the wheels 118 roll against the inner track members 114. The axle members 119 at one side of the truck are in alinement with corresponding axle members 119 at the opposite side of the truck. This arrangement of these wheels holds the respective truck members in proper alinement and prevents substantial oscillation of the truck members. This is an important feature of the invention because, if the truck members were permitted to oscillate during the operation of the cutting devices, the heels would essentially be imperfectly formed and many heels would be damaged or destroyed.

The truck members 115 are spaced apart a sufficient distance to permit the respective cutting devices to operate and cooperate as required to manufacture wood heels of the desired uniformity and perfection.

The mechanisms supported by the respective carriage trucks 115 are duplicates, so that a description of one such mechanism applies to all. Accordingly, I now proceed to a description of one carriage mechanism.

A rotary shaft 120 is mounted in the carriage truck 115 (Figs. 6, 7 and 8) and has supporting nuts 121 attached to its upper end and seated upon a bearing 122. The opposite end of the shaft is in a bearing 123. The shaft 120 extends beyond the bearing and supports the control elements described later.

A guide rail 124 is rigidly supported by a cross member 125 attached to the frames 1 and 2 below the cam elements. A head 126 (Figs. 18 and 22) is attached to the upper end of the shaft 120 and is mounted within an opening in a member 127 having two of its sides and one end curved in conformity with the sides and rear end of the finished heel that is to be produced and finished by the machine. The opposite end of the member 127 has an extended shelf 128, the upper edge of which is arched in end elevation in conformity with the curvature of the under side of the forwardly extended portion of the upper end of the wood heel.

An inclined clamping member 129 has its lower edge connected with the rear end of the head 126 by a hinge 130 and its opposite edge supported by an adjustment screw 131. The screw 131 is screwed through the head 126 and extends into a hole in the clamping member 129, so that by screwing the screw 131 upwardly or downwardly, the engaged end of the clamping member 129 may be raised or lowered so as to vary and adjust the inclination of said clamping member 129 in accordance with the type of heel to be made.

A socket 132 (Figs. 18 and 19) has its lower end mounted on a pivot 133 supported by the truck 115 and permitting the socket to be moved from vertical position to position in which the socket inclines away from the clamping member 129 (Fig. 28). A spring 134 is supported in a spring seat 135 in the truck 115 and has its opposite end engaging in a spring seat 136 in connection with the socket 132 and the power and energy of said spring is utilized to actuate and press the upper end of the socket 132 toward the heel supporting clamping member 129.

An angular clamping arm 137 has a vertical portion extending into the socket 132 and provided with flanges 138 engaging in corresponding grooves in said socket 132 in order to hold said clamping arm 137 from turning. A rod 139 has a circumferential flange 140 seated on the bottom wall of the socket 132 and thereby supports the rod 139. The lower end of the rod 139 is engaged by a locked nut or head 141, thus holding the rod from vertical movement and constituting an engageable element whereby the rod may be turned to screw the upper end of the rod into and from the vertical portion of the angular arm 137. Thus, by rotation of the rod 139, the angular arm 137 may be raised or lowered to different adjusted positions and such adjusted positions may be determined with precision by comparing a graduated scale 142 on the arm 137 with the upper end of the socket 132.

A clamping member 143 is mounted in combined journal and thrust bearings 144 supported by the end of the angular arm 137 that is above the heel blank supporting member 129. The lower end of the clamping member 143 has teeth or serrations 145 that will indent and engage in the upper end of the heel blank and thereby hold the heel blank from turning with respect to said clamping member 143. A spring 146 has one end engaged with the upper end of the clamping member 143 and the opposite end engaged with the clamping arm 137 and functions to hold the clamping member 143 yieldingly in one adjustment.

A resilient abutment 147 for the heel blank has one end provided with slots 148 through which screws 149 extend. The screws 149 are screwed into holes in the socket 132 and thereby rigidly support the resilient abutment 147. These screws 149 may be loosened to permit the resilient abutment 147 to be moved to different adjusted positions as required in the manufacture of heels of different sizes.

The spring seat 136 at the lower end of the socket 132 supports an axle member 150 equipped with rollers 151. The rollers 151 are normally held away from the truck 115 by the spring 134. It is clear that if the rollers 151 be pushed downwardly, the socket 132 will thereby be inclined in a direction away from the heel support 129 (Fig. 28).

Each of the frames 1 and 2 supports a bracket 152 (Fig. 1). A releasing member 153 is attached to each of the brackets 152 (Figs. 2 and 4). The releasing members 153 are spaced apart a distance to permit the movable carriage above described to pass between said releasing members and to permit the rollers 151 to pass under and operate against the lower edges of said releasing members, thereby causing said members 153 to tilt the socket 132 away from the heel support 129. This tilting of the socket 132 away from the heel support 139 raises the clamping member 143 a distance sufficient to permit a heel blank 154 (Fig. 28) to be seated on the support 129. The members 153 are long enough to hold the socket 132 tilted for a sufficient time to permit placement of a heel blank 154 on the support 129. Then the rollers 151 pass beyond the members 153 and the spring 134 immediately expands to engage the clamping member 143 firmly against the upper end of the blank 154. The blank 154 is thereby rigidly clamped and held during the subsequent movements of the supporting carriage and during the operation of the cutting devices.

A pair of angular members, each comprising a vertical arm 155 and a horizontal arm 156, are mounted on pivots 157 supported by the carriage truck 115. Springs 158, mounted between the carriage truck 115 and the horizontal arms 156, hold these members 155—156 in the position indicated to permit inward movement of the arms 156 and swinging movement of the arms 155 when said arms 155 engage tripping lugs hereinafter described.

As stated, a series of these carriages are attached to the chains 112 in spaced relationship. Each carriage has a bed plate 159 serving to catch and support the heel shavings and waste. The respective carriages are connected by sections 160 of flexible material cooperating with the plates 159 to catch and support shavings and waste material and to carry the same to the discharge end of the machine where the shavings and waste material will be discharged when the carriages are inverted. These plates 159 and flexible sections 160 prevent the shavings and waste material from dropping onto the cam structure already described and illustrated in Figs. 25 and 26. To prevent the shavings and waste material from working into the tracks along which the rollers 117 and 118 operate, an apron 161 (Figs. 13 and 14) is attached to the inner side of each of the frames 1 and 2. These aprons 161 extend downwardly and inwardly and have their lower edges over and against the upper surfaces of the truck portions 159 and the connecting sections 160.

A pair of arms 162 (Figs. 15, 18 and 20) are rigid with and extend upwardly from the carriage truck 115 for the purpose of partially controlling the operation of certain of the cutting devices as hereinafter explained.

A motor 163 is mounted on a supporting bracket 164 (Figs. 1 and 6) having a base 165 mounted for inward and outward sliding movements along a guiding support 166. The support 166 is supported for vertical movements between guides 167 and the vertical position of said support 166 may be varied and adjusted by a supporting screw 168 operatively mounted in connection with the frame 1. The bracket 164 may be rigidly secured to the support 166 by a set screw 169 screwed through said bracket 164 for clamping engagement with the support 166. Thus, the device 168 is adjustable to vary the vertical position of the motor 163, and the bracket 164 is adjustable to vary the lateral position of the motor 163. These adjustments may be effected independently of each other. The motor 163 rotates a shaft 170 extending downwardly and equipped with knives 171 constituting cutting devices for cutting the curved breast wall 172 of a heel blank 173. This heel blank 173 is cut to form a Cuban heel which is of less height, and of greater horizontal dimensions at its top end than Louis heels which may also be made by this machine. The motor 163 and the cutting devices 171 in this machine are used only in forming Cuban heels. When Louis heels are to be formed by this machine, the motor 163 is moved outwardly to an inoperative adjustment, so that the cutting devices 171 will not operate upon the heel blank but will permit the heel blank to pass by.

A second motor 174 is mounted on a supporting bracket 175 (Figs. 2 and 7) having a base 176 mounted for inward and outward sliding movements along a guiding support 177. The support 177 is supported for vertical movements between guides 178 and the vertical position of said support 177 may be varied and adjusted by a supporting screw 179 operatively mounted in connection with the frame 1. The bracket 175 may be rigidly secured to the support 177 by a set screw 180 screwed through said bracket 175 for clamping engagement with the support 177. Thus, the device 179 is adjustable to vary the vertical position of the motor 174, and the bracket 175 is adjustable to vary the lateral position of the motor 174. These adjustments may be effected independently of each other. The motor 174 rotates a shaft 181 extending downwardly and equipped with knives 182 constituting cutting devices for cutting the breast wall 183 of a heel blank 184. This heel blank 184 is cut to form a Louis heel which is of greater height, and of less horizontal dimensions at its top end than Cuban heels which may also be made by this machine. The motor 174 and the cutting devices 183 in this machine are used only in forming Louis heels. When Cuban heels are to be formed by this machine, the motor 174 is moved outwardly to an inoperative adjustment, so that the cutting devices 182 will not operate upon the heel blank but will permit the heel blank to pass by. The cutting devices 182 cut the heel breast wall of the heel blank 184 to leave a forward extension 185 to extend forwardly from the heel toward the shoe arch.

A third motor 186 is mounted on a supporting bracket 187 (Figs. 2 and 14) having a base 188 for inward and outward sliding movements along a guiding support 189. The support 189 is supported for vertical movements between guides 190 and the vertical position of said support 189 may be varied and adjusted by a supporting screw 191 operatively mounted in connection with the frame 1. The bracket 187 may be rigidly secured to the support 189 by a set screw 192 screwed through said bracket 187 for clamping engagement with the support 189. Thus, the device 191 is adjustable to vary the vertical position of the motor 186, and the bracket 187 is adjustable to vary the lateral position of the motor 186. These adjustments may be effected independently of each other. The motor 186 rotates a shaft 193 extending downwardly and equipped with knives 194 constituting cutting devices for finishing the cutting operations at the front of the heel blank and particularly the cutting operations across the heel extension 181. This heel blank 184 is cut to form a Louis heel which is of greater height, and of less horizontal dimensions at its top end than Cuban heels which may also be made by this machine. The motor 186 and the cutting devices 194 in this machine are used only in forming Louis heels. When Cuban heels are to be formed by this machine, the motor 186 is moved outwardly to an inoperative adjustment, so that the cutting devices 194 will not operate upon the heel blank, but will permit the heel blank to pass by. The cutting devices 194 form a downwardly arched under surface on the heel extension 181. The support 189 extends inwardly and supports an axle member 195 on which is mounted a roller 196. During the effective operation of the cutting devices 194, the arched shelf 128 travels under the roller 196. The support 189 is mounted for free vertical sliding movements and is raised by the movement of the arched shelf 128 under the roller 196 so as to cause the cutting devices 194 to form a downwardly arched (upwardly arched as seen in Fig. 14) under surface on the heel extension 181. Thus, the cutting devices 194 are automatically operated to form this arched surface on the heel extension after the cutting devices 182 had operated to form the breast wall 183 of the heel.

A motor 197 (Figs. 2 and 10) is supported by a carriage and rotates a shaft 198 rotative in a bearing 199 attached to a support 200. The support 200 is mounted on a pivot 201 and has a laterally extended arm 202 supporting a counterweight 203 for counter-balancing the weight of the motor and the support at the opposite side of the pivot 201. The pivot 201 is carried by a bracket 204 mounted for lateral sliding movements to different adjustments on and along a supporting bracket 205. The bracket 204 may be moved to and held in different adjustments by an adjusting screw 206 operatively supported by the bracket 205 and engaging the bracket 204. The bracket 204 may be secured in its different adjustments by any appropriate means as desired. The bracket 205 is mounted for vertical sliding movements in guides 207 on a carriage side member 208. The upper end of the carriage side member 208 extends inwardly over and is supported by anti-friction bearings 209 supported by the upper end of the frame 2. The bracket 205 may be adjusted vertically by a screw device 210 mounted in the lower end of the frame member 208.

A frame member 211 at the opposite side of the machine is similar to the frame member 208 and has its upper end extended inwardly and supported by anti-friction bearings 212 supported at the upper end of the frame 1. The lower ends of the frame side members 208 and 211 are connected by a cross frame member 213 extending through holes 3 and transversely under the cam support 6.

The upper ends of the frame members 208 and 211 each supports an inwardly extended arm 214. The arms 214 project inwardly in position to be engaged by the arms 155. Accordingly, when the arms 155 engage the arms 214, the carriage to which said arms 214 are attached will be moved longitudinally along the machine for a predetermined distance and until the arms 155 are released from the arms 214. The normal position of the carriage described is toward the left of the machine, as shown in Figs. 1 and 2, which is toward the front of the machine. This motor carriage is automatically returned to its starting position after each movement therefrom by an actuator comprising a weight 215 (Figs. 1 and 2) attached to one end of a flexible support 216. The flexible support 216 passes over and is supported by a pulley 217 and has its opposite end attached to the carriage frame member 211. At the proper time and at the proper position, the arms 155 are disengaged from the arms 214 by cams 218 on said arms 155 operating against cams 219 rigid with and projecting inwardly from the frames 1 and 2 (Fig. 13). The upper surfaces of the cams 218 and the lower surfaces of the cams 219 are beveled, so that when the high points of the cams 218 move under the lowest points of the cams 219, the arms 155 will necessarily be operated and disengaged from the arms 214. Thereupon the actuator 215 operates immediately to move the carriage of the motor 197 to its starting position.

The upper end of the motor shaft 198 has a number of knives 220 constituting cutting devices for performing the initial cutting operations at one side and across about one-half of the rear of either of the blanks 173 or 184. The depth to which the cutting devices 220 will cut into the heel blank to form the curved outer and rear walls is determined and regulated with precision by a roller 221 supported by the bracket 199 and designed and arranged to operate against and along one side of the member 127. The weight of the parts is sufficient to prevent the cutting devices from being moved outwardly and they continue to cut and operate against and along one side and about a portion of the rear of the heel blank during the entire movement from its starting position of the carriage in which these cutting devices are mounted. The frame cross member 213 engages anti-friction bearings 222 operating against an appropriate portion of the frames 1 and 2.

After the heel blank is moved beyond the cutting devices 220, it is subjected to the action of similar cutting devices 223 attached to a motor shaft 224 rotated by a motor 225. The shaft 224 is journalled in a bearing 226 attached to a support 227 mounted on a pivot 228. The pivot 228 is carried by a bracket 229 mounted for lateral sliding adjustments in a bracket 230 and adjusted therein by an adjusting screw 231. The bracket 229 may be held in its adjusted positions by any appropriate fastener. The bracket 229 is mounted for vertical adjustments in a frame side member 232 having its upper end extending inwardly and supported by an anti-friction bearing 233 mounted at the upper end of the frame member 1. The bracket 230 may be adjusted vertically by an adjusting screw 234 supported by the frame member 232. A counter-balance weight 235 is mounted on an arm 236 projecting from the support 227.

A frame member 237 has its upper end extending inwardly and supported by an anti-friction bearing 238 at the upper end of the frame 2. The lower ends of the frame members 232 and 237 are connected by a cross member 239 extending through holes 3 and operating against bearings 240 engaging the upper walls of the holes 3. The frame members 232 and 237 have inwardly extended arms 241 to be engaged by the arms 155 in the same way that the arms 214 are engaged by the arms 155. Thus, the movable carriage in which the cutting devices 223 are mounted is moved along with the heel supporting carriage for a sufficient distance and time to permit said cutting devices 223 to cut the opposite side and rear portion of the heel blank nearly to finished form. The extent to which the cutting devices 223 will operate into the blank is determined and regulated by a roller 242 engaging the side of the member 127. At the proper time, the cams 218 engage other cams 219 projecting inwardly from the frames 1 and 2 and thus release the arms 155 from the arms 241 and permit the cutter carriage to be returned to its starting position. Said carriage is returned to its starting position by a weight 243 attached to one end of a flexible connection 244 that passes over a pulley 245 and has its opposite end attached to said cutter carriage.

The construction of these cutter carriages is now clear and a complete specific description of the elements comprising the two next adjacent motor carriages is unnecessary. A series of blades 246 (Fig. 15), constituting cutting devices, are rotated by a motor shaft 247 driven by a motor 248 supported by swinging member 249 mounted on a pivot 250 in a carriage constructed and mounted like the carriage that supports the cutting devices 220. A cam member 251 is rigid with an adjustable support 252 screwed into the bearing element 233 in which the shaft 247 is journalled. This cutter carriage is provided with arms 254 (Fig. 1) to be engaged by the arms 155. Before the arms 155 engage the arms 254, the cam device 251 rides upon and across the upper end of the adjacent projection 162, thereby moving the cutting blades 246 to position to cut the rounded corners 255 (Fig. 34) on the heel. This is sometimes termed "spooling" the heel. These rounded portions 255 do not extend very far to the rear along the sides of the heel and only toward the top end of the heel. The projection 162 passes quickly beyond the cam 251, permitting the cutting devices 246 to assume their initial relationship to the heel and to cut and finish and smooth one side and about one-half of the rear of the heel. During this cutting and finishing and smoothing of the side and rear portion of the heel, the carriage supporting the cutting devices 246 is moved along by the arms 155, which, at the proper time, are released by the cam devices 218 engaging properly located cam devices 219 in the manner described. From the cutting devices 246, the heel is carried next to a series of cutting devices 256 attached to a motor shaft 257 in a bearing 258 and driven by a motor 259. The bearing 258 is attached to a support 260 mounted on a pivot 261 in an adjustable carriage bracket 262 supported in a carriage which is a duplicate of the carriage that supports the cutting devices 223. The bearing 258 supports a cam device 263 which is a duplicate of the cam device 251 and is attached to an adjustable support 264. Before the arms 155 engage the carriage arms 265 (Fig. 1), the cam 263 rides upon the adjacent projection 162, causing the cutting devices 256 to cut the opposite rounded corner 266 and thereby spool the opposite side of the heel (Fig. 34). The heel supporting carriage quickly carries the projection 162 beyond the cam 263 and, at the same time, engages the arms 155 with the arms 265, thereby moving the cutter carriage along with the heel carriage and causing the cutting devices to operate against and smooth and finish the adjacent side and rear portion of the heel.

The carriage supporting the cutting devices 246 is returned to its starting position by an actuator 267 attached to one end of a flexible member 268 passing over a pulley 269 and connected with the carriage. Similarly the carriage that supports the cutting devices 256 is returned to its starting position by an actuator 270 attached to one end of a connection 271 passing over a pulley 272 and connected with said carriage that supports the cutting devices 256.

The carriage that supports the cutting devices 246 has a roller 273 (Fig. 15) for operating against the member 127 and determining the extent to which the cutting devices 246 may cut into the heel. Similarly the carriage that supports the cutting devices 256 has a roller 274 operating in a similar manner against the opposite side of the member 127 and determining the extent to which the cutting devices 256 may cut into the heel.

After the heel blank has been shaped and formed by operation of the several cutting devices described, a portion of the top end of the blank is severed, thus completing the shaping of the blank into a finished heel other than the end of the heel that is to be attached to the shoe. A bracket 275 is attached to the frame 1 (Figs. 1, 2 and 16). A tubular shaft 276 is journalled for rocking movements in bearings in the bracket 275. A lever 277 has one end attached to the shaft 276 and extends inwardly across the frame 1. The inner end 278 of the lever 277 extends downwardly in position to be engaged by the adjacent projection 162. An actuator 279 is attached to one end of a flexible support 280 that passes over a pulley 281 and has its opposite end attached to and wound around the tubular shaft 276 in order to hold said shaft in a starting position and permit turning movements of said shaft by the projection 162 engaging and operating the lever 277. After the projection 162 passes beyond and out of engagement with the end 278 of the lever 277, the actuator 279 operates to turn the shaft 276 and thereby move the lever 277 to its starting position. The starting position of the lever 277 is against the end wall of a slot 282 in an angular plate 283 attached to the frame 1. This slot 282 is long enough to permit free swinging movement of the lever 277 from said starting position.

A shaft 284 is rotatively mounted in a support 285 rigid in the shaft 276. The support 285 is within a circumferential groove 286 in the shaft 284 and thus permits said shaft to be rotated freely and prevents longitudinal movements of said shaft. A tubular shaft 287 is mounted for vertical sliding movements in the tubular shaft 276 and is held from turning relative to said shaft 276 and is required to turn with said shaft 276 by a key 288 rigid with said shaft 276 and engaging in a longitudinal slot 289 in the shaft 287. The upper end of the shaft 287 is screwed on the upper end of the shaft 284 and a handle or hand wheel 290 is attached to the upper end of said shaft 284 for rotating said shaft. It is now clear that by rotating the shaft 284, the shaft 287 may be moved vertically to different adjusted positions and supported in such positions.

An arm 291 is rigidly secured to the upper end of the tubular shaft 287 and extends obliquely inwardly (Fig. 1). This arm 291 supports a motor 292 for rotating the downwardly extending shaft 293. A disc saw or other appropriate cutting device 294 is attached to the lower end of the shaft 293. In the idle or starting position of the arm 277, the saw 294 is supported laterally out of the line of movement of the heel blank as the heel blank is carried along by the heel supporting carriage. When the projection 162 engages and oscillates the arm 277, the cutting member 294 is thereby swung inwardly into the path of the moving heel blank, as will be readily understood by reference to the broken line illustration of the cutting device in Fig. 16. This cutting device will sever the top end portion of the heel blank along a predetermined line, while the heel blank remains supported in the supporting carriage.

During operation of the cutting device 294 through the heel blank, it is desirable to reduce the pressure of the clamping member 143 against the end of the heel blank, so that the separated portions of the heel blank will not be clamped against the cutting device 294 with excessive pressure. Accordingly, the plate 283 is formed with a releasing member 295 identical with a releasing member 296 formed on a plate 297 attached to the frame 2 (Fig. 11). The members 295 and 296 incline downwardly gradually and are engaged by the rollers 251. The rollers 251 operating against the releasing members 295 and 296 compress the spring 134 slightly and to an extent sufficient to reduce the pressure of the clamping member 143 upon and against the end of the heel blank and to prevent said clamping member from clamping the severed portion of the heel blank firmly against the cutting device 294. This continues during the cutting operation and until the projection 162 disengages the end 278 of the lever 277, whereupon the actuator 279 immediately swings the cutting device 294 away from the heel blank. The rollers 151 continue to roll along the members 295 and 296 until they reach the low edges 298 of said members, whereupon the clamping member 143 is wholly released and disengaged from the heel blank. The heel blank remains seated upon the support 129 until the supporting carriage for the heel blank begins to move downwardly at the rear or discharge end of the machine. Then, because all pressure against the heel blank is entirely released, it will drop from the supporting carriage.

A crank 299 is attached to the lower end of the shaft 120 and supports two downwardly extended axles 300. A roller 301 is mounted on one of said axles and a similar roller 302 is mounted on the other axle, and these rollers are arranged and designed to engage and cooperate with the various cams shown in Figs. 25 and 26 of the drawings and to turn the shaft 120 to present different surfaces of the heel blanks to the different cutting devices that have been described.

In the embodiment of the invention shown, the machine is constructed to manufacture both Cuban and Louis heels. The machine comprises eight cutting devices and operating mechanisms therefor, and the positions of these cutting devices are indicated by 1st, 2d, 3d, 4th, 5th, 6th, 7th and 8th, respectively, in Fig. 1, and the relative positions of said cutting devices to the heel operating cams are also indicated by 1st, 2d, 3d, 4th, 5th, 6th, 7th and 8th, respectively, in Fig. 26.

When the machine is operated, the rollers 301 and 302 engage opposite sides of the cam 8, thereby positively preventing turning of the shaft 120. During movement of the rollers 301 and 302 along the sides of the cam 8, the rollers 151 pass under the cams 153 and thereby tilt the socket 132 and support the clamping member 143 in ineffective position, permitting placement of a heel blank 154 or a heel blank 184 upon the support 129 in the position in which the breast edge of the heel blank engages the resilient abutment 147. The operator manually places and holds the heel blank on the support 129 until the rollers 151 pass beyond the cams 153, whereupon the spring 134 immediately expands and engages the clamping member 143 against the top end of the heel blank effectively to clamp and hold the heel blank with sufficient rigidity to prevent the heel blank from turning when operated upon by the cutting devices.

When a Cuban heel is to be made, the 2d, 3d, 6th and 7th cutting devices are not used, are moved to ineffective adjustments, and need not be operated. Accordingly, in the manufacture of a Cuban heel, only the 1st, 4th, 5th and 8th cutting devices are maintained in effective position, are used and operated.

And, during the manufacture of a Cuban heel, the heel blank is operated upon by the 1st cutting device during the time that the rollers 302 and 301 pass the 1st position (Fig. 26). After the roller 301 passes said 1st position, the Cuban heel blank is not operated upon by any cutting device until the rollers 301 and 302 engage and are operated by the cam 31 for the 4th cutting device. As shown (Fig. 26), the rollers 301 and 302 roll along the walls of the cam 8 and pass the 2d and 3d cutting devices. The roller 302, leaving the cam wall 18, engages the cam point 29 and causes the roller 301 to pass through the space 25 to the cam wall 26 while the roller 302 rolls along the cam wall 30. The roller 302, leaving the cam wall 30, engages the end of the cam 31, thereby swinging the roller 301 in advance of the roller 302 and against the cam wall 23. This turns the shaft 120 and causes the 4th cutting device, comprising the cutters 220 (Fig. 10), to cut one side wall and a portion of the rear of the Cuban heel blank to proper curvature. Leaving the cam point 35, the roller 301 engages the cam wall 43 and causes the roller 302 to pass through the space 44 and roll along the walls 40 and 41, while the roller 301 rolls along the walls 46 and 47. The roller 301, leaving the cam wall 47, engages the end of the cam 49 and swings the roller 302 forwardly to the cam point 52, causing the roller 301 to pass through the space 56 and thereby causing the 5th cutting device, comprising the cutters 223, to cut the opposite side and adjacent rear portion of the Cuban heel blank to proper curvature.

The roller 302, leaving the cam 49, engages the cam wall 61 and swings the roller 301 through the space 66 and causes the rollers 301 and 302 to roll along opposite sides of the cam member 57. The rollers 301 and 302 are operated by the cam members 67, 75 and 84 but without result or effect, because the 6th and 7th cutting devices are unoperated. The cam roller 302, leaving the cam member 85, engages the cam wall 98 and causes the roller 301 to pass through the space 101. The rollers 301 and 302 then roll along the walls 94 and 95 of the cam member 93 and the top end portion of the heel blank is severed by the cutting device 294, the clamp 143 is released by the members 296 and 298, and the Cuban heel is discharged.

In adjusting the machine for use for the manufacture of Louis heels, the 1st cutting device is moved to ineffective position and need not be operated. The clamping device 143 is opened or moved to open position by the cams 153, permitting the operator to place and retain a Louis heel blank 184 on the support 129 until the rollers 151 pass beyond and out of engagement with the cams 153. Thereupon the spring 134 expands and firmly engages the clamping member 143 with the top end of the heel blank, so that said heel blank will be rigidly held during the operation of the several cutting devices. The roller 301, leaving the cam member 8, engages the end 13 of the cam member 10 and is caused to pass through the space 22 to the same side of the cam member 10 along which the roller 302 operates. These rollers pass the 1st cutting device and 1st position without subjecting the heel blank to the operation of the 1st cutting device. During the time that the rollers 301 and 302 pass the 2d position, the breast wall 183 of the Louis heel blank 184 is cut by the cutting devices 182. The heel blank is held in the same position during the time that the rollers 302 and 301 pass the 3d cutting device and 3d position, the roller 196 (Fig. 14) rolling over the arcuate shelf 128 and forming the arcuate extension 181 at the front of the upper end of the heel.

Leaving the cam member 10, the roller 302 engages and is operated by the cam point 29, swinging the roller 301 through the space 25 to the opposite side of the cam member 23 from the roller 302. The roller 302, leaving the cam member 23, engages the end of the cam member 31, swings forwardly the roller 301 and causes the roller 302 to pass through the space 34. This passes the heel blank through the 4th position and subjects the heel blank to the action of the 4th cutting device (Fig. 10) in which one side and a portion of the rear of the heel blank is cut to approximately finished form. The roller 301, leaving the cam member 31, engages the cam wall 43 and swings the roller 302 forwardly through the space 44 to the opposite side of the cam member 39. Leaving the cam member 39, the roller 301 engages the end of the cam member 41 and swings forwardly the roller 302, causing the roller 301 to pass through the space 56. During the time that the rollers 302 and 301 are passing the 5th position (Fig. 26), the opposite side and rear portion of the heel blank are subjected to the cutting action of the 5th cutting device (Fig. 12), thus nearly finishing the heel. The roller 302, leaving the cam device 49, engages the cam wall 61 and swings the roller 301 through the space 66 to the opposite side of the cam member 57. The roller 302, leaving the cam member 57, engages the cam member 67 and swings forwardly the roller 301, causing the roller 302 to pass through the space 74. During the time that the rollers 301 and 302 are passing the 6th position (Fig. 26), the Louis heel blank is subjected to the action of the 6th cutting device (Fig. 15) which cuts off a portion of the front corner of the heel blank, as indicated at 255, thus producing the spool effect.

The roller 301, leaving the cam member 67, engages the cam wall 79 and swings the roller 302 forwardly, causing said roller 302 to pass to the opposite side of the cam member 75. Leaving the cam member 75, the roller 301 engages the cam member 85 and swings forwardly the roller 302, causing the roller 301 to pass through the space 92. During the time that the rollers 302 and 301 are passing the 7th position, the heel blank is subjected to the action of the 7th cutting device (Fig. 8), thus spooling or rounding the opposite corner 255 of the heel blank.

The roller 302, leaving the cam member 85, engages the cam wall 98 and swings forwardly the roller 301, causing said roller 301 to pass through the space 101 and to roll along the wall 94 while the roller 302 rolls along the wall 95.

The heel blank is held in this position during the time that the rollers 301 and 302 pass the 8th position and are subjected to the action of the 8th cutting device 294 (Fig. 16) which severs the top end portion of the heel blank.

The rollers 151 then pass along the cam surfaces 298, holding the clamping device 143 in ineffective position and permitting the nearly finished heel blank to drop out.

Either before or after these operations, the end of the heel that is to be attached to the shoe may be dished or otherwise shaped and formed preparatory for final attachment to a shoe.

It is now clear that my invention obtains all of its intended objects and purposes almost automatically with speed, safety, economy and precision. The motors and other equipment may be made of comparatively light weight and of low power consumption, so that the machine may be operated inexpensively.

The construction, arrangement and relationship of the various elements and the sequence of the operation of the cutting devices on the heel blank may be varied widely within the scope of equivalent limits without departure from the nature and principle of the invention.

I do not restrict myself in any unessential particulars, but what I claim and desire to secure by Letters Patent is:

1. In a machine of the character described, a traveling carriage, mechanism for holding a wood heel blank rigidly on said carriage, devices for oscillating said mechanism and thereby the heel blank during movement of said carriage, and a series of cutting devices operating to cut said blank successively to form the breast and outer walls of the heel during movement of said carriage.

2. In a machine of the character described, a series of cutting devices for cutting heel blanks to form the breast and outer walls of heels, and mechanism for supporting and continuously moving a heel blank adjacent to said cutting devices and causing said cutting devices first to cut said blank to form the breast wall of the heel and then to cut said blank to form successively the opposite sides and portions of the rear wall of the heel during continuous movement of said mechanism.

3. In a machine of the character described, a series of cutting devices for cutting respectively the breast and outer walls of heels on heel blanks, a traveling carriage, and mechanism for continuously moving said carriage to present a heel blank mounted therein to the action of said cutting devices and causing said cutting devices first to cut said blank to form the breast wall of the heel and then to cut one side and a portion of the rear of said blank to form one side wall and a portion of the rear wall of the heel and then to cut the opposite side and remaining portion of the rear of said blank to form the opposite side wall and remaining portion of the rear wall of the heel.

4. In a machine of the character described, a series of cutting devices for cutting respectively the breast and outer walls of heels on heel blanks, a traveling carriage, mechanism for continuously moving said carriage to present a heel blank mounted therein to the action of said cutting devices and causing said cutting devices first to cut said blank to form the breast wall of the heel and then to cut one side and a portion of the rear of said blank to form one side wall and a portion of the rear wall of the heel and then to cut the opposite side and remaining portion of the rear of said blank to form the opposite side wall and remaining portion of the rear wall of the heel, and automatic mechanism for severing the top end portion of the heel blank during movement of said carriage.

5. In a machine of the character described, a traveling carriage, a series of cutting devices for cutting heel blanks to form the breast and outer walls of heels and for spooling portions of the heels, and mechanism for supporting a heel blank in said carriage and causing said cutting devices first to form the breast wall of the heel and then successively to form the opposite side walls and portions of the rear wall of the heel and thereafter to spool a portion of the heel during continuous movement of said carriage.

6. In a machine of the character described, a traveling carriage, a series of cutting devices for cutting heel blanks to form the breast and outer walls of heels and for spooling portions of the heels, mechanism for supporting a heel blank in said carriage and causing said cutting devices first to form the breast wall of the heel and then successively to form the opposite side walls and portions of the rear wall of the heel and thereafter to spool a portion of the heel during continuous movement of said carriage, and mechanism for severing the top end portion of the heel blank after operation of said cutting devices on said blank as aforesaid.

7. In a machine of the character described, a traveling carriage, a series of cutting devices for cutting heel blanks to form the breast and outer walls of heels and for spooling portions of the heels, mechanism for supporting a heel blank in said carriage and causing said cutting devices first to form the breast wall of the heel and then successively to form the opposite side walls and portions of the rear wall of the heel and thereafter to spool a portion of the heel during continuous movement of said carriage, mechanism for severing the top end portion of the heel blank after operation of said cutting devices on said blank as aforesaid, and means for releasing said blank from said carriage.

8. In a machine of the character described, a traveling carriage, clamping mechanism in said carriage for holding a heel blank, automatic means for opening said clamping mechanism to receive a heel blank and for closing said clamping mechanism during movement of said carriage, and a series of cutting devices operating automatically to cut the breast and outer walls of the blank to form the breast and outer walls of the heel during continuous movement of said carriage.

9. In a machine of the character described, a traveling carriage, clamping mechanism in said carriage for holding a heel blank, automatic means for opening said clamping mechanism to receive a heel blank and for closing said clamping mechanism during movement of said carriage, a series of cutting devices operating automatically to cut the breast and outer walls of the blank to form the breast and outer walls of the heel during continuous movement of said carriage, and means for adjusting and controlling said clamping mechanism to engage heel blanks of different lengths.

10. In a machine of the character described, a traveling carriage, mechanism for holding a heel blank in said carriage, and a series of cutting devices movable by and along with said carriage for cutting different portions of the walls of said heel blank to form different walls of the heel during continuous movement of said carriage.

11. In a machine of the character described, a traveling carriage, mechanism for holding a heel blank in said carriage, a series of cutting devices movable by and along with said carriage for cutting different portions of the walls of said heel blank to form different walls of the heel during continuous movement of said carriage, and means for operating and moving said mechanism that holds the heel blank in said carriage to present different portions of said heel blank to said different cutting devices.

12. In a machine of the character described, a traveling carriage, mechanism for holding a heel blank in said carriage, a series of cutting devices for cutting different portions of the walls of said heel blank to form different walls of the heel during continuous movement of said carriage, means for operating and moving said mechanism that holds the heel blank in said carriage to present different portions of said heel blank to different ones of said cutting devices to cause said cutting devices successively to cut curved walls, and automatic means for releasing said holding mechanism from the heel blank.

13. In a machine of the character described, a traveling carriage, a cutting device, a motor for operating said cutting device, a carriage supporting said cutting device and said motor, devices for holding a wood heel blank in said traveling carriage, means for continuously moving said traveling carriage to present the heel blank therein to said cutting devices, mechanism for turning said holding devices to present different portions of the heel blank to said cutting devices, and means for moving said second carriage a predetermined distance during the operation of said cutting devices on said heel blank.

14. In a machine of the character described, a traveling carriage, a cutting device, a motor for operating said cutting device, a carriage supporting said cutting device and said motor, devices for holding a wood heel blank in said traveling carriage, means for continuously moving said traveling carriage to present the heel blank therein to said cutting devices, means for moving said second carriage a predetermined distance during the operation of said cutting devices on said heel blank, and means for turning said heel blank to present different portions thereof to said cutting devices during the operation of said cutting devices and the movement of said second carriage.

15. In a machine of the character described, a traveling carriage, a cutting device, a motor for operating said cutting device, a carriage supporting said cutting device and said motor, devices for holding a wood heel blank in said traveling carriage, means for continuously moving said traveling carriage to present the heel blank therein to said cutting devices, means for moving said second carriage a predetermined distance during the operation of said cutting devices on said heel blank, means for turning said heel blank to present different portions thereof to said cutting devices during the operation of said cutting devices and the movement of said second carriage, and a cutting device for forming a downwardly curved wall at the forward extension of the heel formed from said blank.

16. In a machine of the character described, a cutting device for cutting the breast wall of a heel and forming a forward extension at the upper end thereof, a cutting device for forming a curved wall at the under side of said forward extension, a cutting device for cutting one outer side and a portion of the rear wall of the heel, an additional cutting device for cutting the opposite outer side and remaining portion of the rear wall of the heel, and mechanism for continuously moving said carriage to subject the heel blank therein to the action of said cutting devices as aforesaid.

17. In a machine of the character described, a cutting device for cutting the breast wall of a heel and forming a forward extension at the upper end thereof, a cutting device for forming a curved wall at the under side of said forward extension, a cutting device for cutting one outer side and a portion of the rear wall of the heel, an additional cutting device for cutting the opposite outer side and remaining portion of the rear wall of the heel, mechanism for continuously moving said carriage to subject the heel blank therein to the action of said cutting devices as aforesaid, and cutting devices for cutting away portions of the front corners formed by the intersection of the outer and breast walls of the heels.

18. In a machine of the character described, a cutting device for cutting the breast wall of a heel and forming a forward extension at the upper end thereof, a cutting device for forming a curved wall at the under side of said forward extension, a cutting device for cutting one outer side and a portion of the rear wall of the heel, an additional cutting device for cutting the opposite outer side and remaining portion of the rear wall of the heel, mechanism for continuously moving said carriage to subject the heel blank therein to the action of said cutting devices as aforesaid, cutting devices for cutting away portions of the front corners formed by the intersection of the outer and breast walls of the heels, and means for discharging the heel formed as aforesaid from said carriage.

19. In a machine of the character described, a traveling carriage, mechanism for holding a wood heel blank rigidly on said carriage, a cutting device for cutting said blank to form the breast wall of a heel, a cutting device for cutting said blank to form one side wall and a portion of the rear wall of the heel, an additional cutting device for cutting said blank to form the other side wall and remaining portion of the rear wall of the heel, and means controlled by said carriage controlling the time of operation of said two last named cutting devices on said heel blank.

20. In a machine of the character described, a traveling carriage, mechanism for holding a wood heel blank rigidly on said carriage, a cutting device for cutting said blank to form the breast wall of a heel, a cutting device for cutting said blank to form one side wall and a portion of the rear wall of the heel, an additional cutting device for cutting said blank to form the other side wall and remaining portion of the rear wall of the heel, means controlled by said carriage controlling the time of operation of said two last named cutting devices on said heel blank, and a cutting device for severing the top end of the heel blank.

21. In a machine of the character described, a traveling carriage, mechanism for holding a wood heel blank rigidly on said carriage, a cutting device for cutting said blank to form the breast wall of a heel, a cutting device for cutting said blank to form one side wall and a portion of the rear wall of the heel, an additional cutting device for cutting said blank to form the other side wall and remaining portion of the rear wall of the heel, means controlled by said carriage controlling the time of operation of said two last named cutting devices on said heel blank, a cutting device for cutting a portion of one corner of the heel blank at the intersection of one of said side walls with said breast wall, and an additional cutting device for cutting the opposite corner of said heel at the intersection of said opposite side wall and said breast wall.

22. In a machine of the character described, a traveling carriage, mechanism for holding a wood heel blank rigidly on said carriage, a cutting device for cutting said blank to form the breast wall of a heel, a cutting device for cutting said blank to form one side wall and a portion of the rear wall of the heel, an additional cutting device for cutting said blank to form the other side wall and remaining portion of the rear wall of the heel, means controlled by said carriage controlling the time of operation of said two last named cutting devices on said heel blank, a cutting device for cutting a portion of one corner of the heel blank at the intersection of one of said side walls with said breast wall, an additional cutting device for cutting the opposite corner of said heel at the intersection of said opposite side wall and said breast wall, and a cutting device for severing the top end portion of the heel blank.

23. In a machine of the character described, a traveling carriage, means for supporting a wood heel blank on said carriage, cutting devices operating to cut said blank successively to form an inwardly curved breast wall and a downwardly curved forward extension at the upper end of the heel blank during movement of said carriage, and means operated by said carriage controlling operation of said cutting device that forms said downwardly curved forward extension.

24. In a machine of the character described, a traveling carriage for supporting a wood heel blank, a pair of cutting devices operating to cut said blank successively to form a curved breast wall and a downwardly curved forward extension at the upper end of the heel blank during movement of said carriage, and additional cutting devices operating successively to cut curved side and rear walls on said blank during further movement of said carriage.

25. In a machine of the character described, a traveling carriage for supporting a wood heel blank, cutting devices, carriages for supporting said cutting devices respectively in position to cut curved side and rear walls on the heel blank during movement of said first carriage, and means controlled by said first carriage for moving said second carriages along with said first carriage a sufficient distance and time for said cutting devices to perform said cutting operations.

26. In a machine of the character described, a traveling carriage for supporting a wood heel blank, cutting devices operating to cut said blank successively to form a breast wall across said blank and a curved wall around the outer surface of said blank during movement of said carriage, and additional cutting devices for cutting portions from the corners formed at the intersection of said outer wall and said breast wall at opposite sides of the heel.

27. In a machine of the character described, a traveling carriage for supporting a wood heel blank, cutting devices operating to cut said blank successively to form a breast wall across said blank and a curved wall around the outer surface of said blank during movement of said carriage, additional cutting devices for cutting portions from the corners formed at the intersection of said outer wall and said breast wall at opposite sides of the heel, and a cutting device operating to sever the top end portion of the heel blank.

28. In a machine of the character described, a traveling carriage, a rotary support having a heel blank mounted in said carriage, cutting devices for cutting the breast and outer walls of the heel blank during movement of said carriage, and mechanism for rotating said support to present the breast and outer walls to predetermined cutting devices during movement of said carriage.

29. In a machine of the character described, a traveling carriage for supporting a heel blank, cutting devices for forming the breast wall of a heel on said blank, means supported by said carriage controlling operation of one of said cutting devices, and additional cutting devices for cutting said blank to form the outer walls of the heel during movement of said carriage.

30. In a machine of the character described, a traveling carriage for supporting a heel blank, cutting devices for forming the breast wall of a heel on said blank, means supported by said carriage controlling operation of one of said cutting devices, additional cutting devices for cutting said blank to form the outer walls of the heel during movement of said carriage, and means controlled by said carriage controlling operation of certain of said last named cutting devices on said heel blank.

31. In a machine of the character described, a traveling carriage for supporting a wood heel blank, mechanisms operating to cut said blank to form a heel during movement of said carriage, and mechanism for severing the top end portion of the heel blank during movement of said carriage.

32. In a machine of the character described, a traveling carriage for supporting a wood heel blank, cutting devices for forming a breast wall and a curved outer wall on said blank intersecting said breast wall at opposite sides, and cutting devices for cutting away portions of the heel blank at the intersection of said outer wall and said breast wall at opposite sides of the blank.

33. In a machine of the character described, a traveling carriage for supporting a wood heel blank, cutting devices for forming a breast wall and a curved outer wall on said blank intersecting said breast wall at opposite sides, cutting devices for cutting away portions of the heel blank at the intersection of said outer wall and said breast wall at opposite sides of the blank, and a device for cutting off the top end portion of the heel blank during movement of said carriage.

34. In a machine of the character described, a traveling carriage for supporting a wood heel blank, a series of cutting devices supported in spaced relationship, mechanism for moving said carriage adjacent to said cutting devices, and mechanism for turning the wood heel blank to present different portions thereof to different cutting devices during movement of said carriage.

35. In a machine of the character described, a traveling carriage for supporting a wood heel blank, mechanism for turning a wood heel blank to different positions in said carriage automatically and as an incident to the travel of said carriage, and a series of cutting devices for operating successively on said blank to form the breast and outer walls thereof during movement of said carriage.

36. In a machine of the character described, a traveling carriage for supporting a wood heel blank, mechanism for turning a wood heel blank to different positions in said carriage automatically and as an incident to the travel of said carriage, a series of cutting devices for operating successively on said blank to form the breast and outer walls thereof during movement of said carriage, and an additional cutting device for severing the top end portion of the heel blank during movement of said carriage.

37. In a machine of the character described, a traveling carriage, a rockable support in said carriage for supporting a wood heel blank, devices for rocking said support to turn different portions of said blank toward the sides of said carriage during movement of said carriage, and a series of cutting devices for cutting the breast and outer walls of a heel on said blank during movement of said carriage and turning of said blank.

38. In a machine of the character described, a traveling carriage, mechanism for holding a wood heel blank rigidly on said carriage and for turning said blank to different positions, a series of cutting devices mounted in spaced relationship in position to operate on said blank during movement of said carriage, and means for cutting off the end portion of the heel blank during movement of said carriage.

39. In a machine of the character described, a traveling carriage for supporting a heel blank, a series of cutting devices for cutting different portions of the walls of said heel blank to form different walls of the heel during continuous movement of said carriage, means for turning the heel blank in the carriage to present different portions thereof to the different cutting devices, and means operated by said carriage for moving said cutting devices along with said carriage predetermined distances.

40. In a machine of the character described, a traveling carriage, rotary clamping means in said carriage for clamping and holding a heel blank, spaced cutting devices for cutting different portions of the walls of said heel blank to form different walls of the heel during continuous movement of said carriage, and means for rotating said clamping means and thereby said heel blank to present different portions of the heel blank to the different cutting devices during movement of said carriage.

41. In a machine of the character described, a traveling carriage, rotary clamping means in said carriage for clamping and holding a heel blank, spaced cutting devices for cutting different portions of the walls of said heel blank to form different walls of the heel during continuous movement of said carriage, means for rotating said clamping means and thereby said heel blank to present different portions of the heel blank to the different cutting devices during movement of said carriage, a cutting device for severing the top end portion of the heel blank, and devices for releasing said clamping means from the heel blank to discharge the heel blank therefrom.

42. In a machine of the character described, a traveling carriage, means for securing and holding a heel blank in said carriage, a pair of spaced cutting devices for cutting said heel blank to form the breast wall and an under curved forward extension at the upper end of the heel blank during movement of the carriage, spaced cutting devices for cutting different portions of said heel blank to form the outer wall of said heel blank during movement of the carriage, and means for discharging the heel blank from said carriage.

43. In a machine of the character described, a traveling carriage, rotary clamping means for engaging and holding a heel blank in said carriage, a pair of spaced cutting devices for cutting said heel blank to form the breast wall of the heel and a downwardly curved forward extension at the upper end of the heel during movement of the carriage, a pair of spaced cutting devices for cutting different portions of the heel blank to form different portions of the outer wall of the heel during continuous movement of the carriage after said first pair of cutting devices have operated on said blank, and a third pair of cutting devices operating to cut portions of the heel blank at the intersections of said walls.

44. In a machine of the character described, a traveling carriage, rotary clamping means for engaging and holding a heel blank in said carriage, a pair of spaced cutting devices for cutting said heel blank to form the breast wall of the heel and a downwardly curved forward extension at the upper end of the heel during movement of the carriage, a pair of spaced cutting devices for cutting different portions of the heel blank to form different portions of the outer wall of the heel during continuous movement of the carriage after said first pair of cutting devices have operated on said blank, a third pair of cutting devices operating to cut portions of the heel blank at the intersections of said walls, a cutting device for severing the top end portion of the heel blank after operation of all of the aforesaid cutting devices, and devices for releasing said clamping means from the heel blank during movement of the carriage.

45. A machine of the character described comprising a continuously traveling carriage for supporting a heel blank, a pair of cutting devices operating to cut successively different portions of the front wall of the blank to form the front of a heel during continuous movement of said carriage, a plurality of additional cutting devices for cutting the outer wall of the heel during continuous movement of the carriage after said pair of cutting devices have cut said heel blank as aforesaid, and means for discharging the heel blank from said carriage.

46. In a machine of the character described, a rotary support for holding a wood heel blank, a carriage in which said support is mounted, a series of cutters arranged to cut said blank successively to form the breast and outer walls of a heel, rollers in connection with said support, and cams engaging said rollers to turn said support as required to present different portions of the blank to the different cutters.

47. In a machine of the character described, a series of spaced cutters, a traveling carriage movable adjacent to said cutters successively, a rotary shaft in said carriage, a support on said shaft for a heel blank, a clamping device for clamping the heel blank on said support, rollers supported by said shaft, and cams engaging said rollers and cooperating therewith to turn said shaft to present different portions of the heel blank to different cutters.

48. In a machine of the character described, a series of spaced cutters, a traveling carriage movable adjacent to said cutters successively, a rotary shaft in said carriage, a support on said shaft for a heel blank, a clamping device for clamping the heel blank on said support, rollers supported by said shaft, cams engaging said rollers and cooperating therewith to turn said shaft to present different portions of the heel blank to different cutters, and means for severing the top end portion of the heel blank after said cutters have operated on said blank.

49. In a machine of the character described, a movable carriage, a cutting device supported by said carriage, a shaft mounted in said carriage for rotating said cutting device, means for rotating said shaft, a traveling carriage movable adjacent to said movable carriage, mechanism in said traveling carriage for supporting and presenting a wood heel blank to said cutting device, and means mounted in said traveling carriage for engaging a part of said movable carriage and moving said movable carriage a distance with said traveling carriage during operation of said cutting device on said blank.

50. In a machine of the character described, a movable carriage, a cutting device supported by said carriage, a shaft mounted in said carriage for rotating said cutting device, means for rotating said shaft, a traveling carriage movable adjacent to said movable carriage, mechanism in said traveling carriage for supporting and presenting a wood heel blank to said cutting device, a member in said traveling carriage for engaging and moving said movable carriage along with said traveling carriage during operation of the cutting device on the wood heel blank, and means for releasing said member from said movable carriage.

51. In a machine of the character described, a movable carriage, a cutting device supported by said carriage, a shaft mounted in said carriage for rotating said cutting device, means for rotating said shaft, a traveling carriage movable adjacent to said movable carriage, mechanism in said traveling carriage for supporting and presenting a wood heel blank to said cutting device, a member in said traveling carriage for engaging and moving said movable carriage along with said traveling carriage during operation of the cutting device on the wood heel blank, means for releasing said member from said movable carriage, and additional cutting devices for finishing the walls of the heel on said blank and severing the top end portion of the heel.

52. In a machine of the character described, a movable carriage, a cutting device supported by said carriage, a shaft mounted in said carriage for rotating said cutting device, means for rotating said shaft, a traveling carriage movable adjacent to said movable carriage, mechanism in said traveling carriage for supporting and presenting a wood heel blank to said cutting device, a member in said traveling carriage for engaging and moving said movable carriage along with said traveling carriage during operation of the cutting device on the wood heel blank, means for releasing said member from said movable carriage, additional cutting devices for finishing the walls of the heel on said blank and severing the top end portion of the heel, and means for releasing the heel from said traveling carriage.

53. A machine of the character described comprising a pair of cutting devices, mechanism for supporting and moving a wood heel blank adjacent to said cutting devices and causing said cutting devices to cut the breast wall and the downwardly rounded forward extension of a heel on said blank, and an additional pair of cutting devices operating to form successively opposite sides and adjacent rear portions of the outer wall of the heel of said blank.

54. A machine of the character described comprising a pair of cutting devices, mechanism for supporting and moving a wood heel blank adjacent to said cutting devices and causing said cutting devices to cut the breast wall and the downwardly rounded forward extension of a heel on said blank, an additional pair of cutting devices operating to form successively opposite sides and adjacent rear portions of the outer wall of the heel of said blank, and additional cutting devices for spooling the corners formed by the intersection of the outer and breast walls of the heel.

55. A machine of the character described comprising a pair of cutting devices, mechanism for supporting and moving a wood heel blank adjacent to said cutting devices and causing said cutting devices to cut the breast wall and the downwardly rounded forward extension of a heel on said blank, an additional pair of cutting devices operating to form successively opposite sides and adjacent rear portions of the outer wall of the heel of said blank, and means for severing the top end portion of the heel after said walls have been formed.

56. In a machine of the character described, a traveling carriage, a clamping device in said carriage for receiving and holding a wood heel blank during cutting of the blank to form the heel walls, automatic means for opening said clamping device to receive a blank, a series of cutters for forming successively the breast wall, the downwardly rounded forward extension at the upper end of the heel blank and the outer wall of the heel while the blank is held by said clamping device, and automatic means for releasing said clamping device from the heel.

57. In a machine of the character described, a traveling carriage, a clamping device in said carriage for receiving and holding a wood heel blank during cutting of the blank to form the heel walls, automatic means for opening said clamping device to receive a blank, a series of cutters for forming successively the breast wall, the downwardly rounded forward extension at the upper end of the heel blank and the outer wall of the heel while the blank is held by said clamping device, a device for severing the top end portion of the heel blank, and automatic means for releasing the clamping device from the heel blank.

58. In a machine of the character described, a traveling carriage for supporting a wood heel blank, a pivoted cutting device, mechanism for moving said cutting device in unison with the movement of said carriage for a predetermined distance and time, means for moving said cutting device to different cutting positions during movement of said cutting device in unison with said carriage, and mechanism for turning the wood heel blank to present different portions thereof to said cutting device and causing said cutting device to cut walls of different curvature on said blank.

59. In a machine of the character described, a traveling carriage for supporting a wood heel blank, a pivoted cutting device, and mechanism timed to move said heel blank to present different portions thereof to said cutting device and to move said cutting device along with said carriage and also to different angles of inclination to cut an outer wall of different curvature on said blank during movement of said carriage and said cutting device along therewith.

60. In a machine of the character described, a series of pivoted cutting devices, a traveling carriage for supporting and moving a wood heel blank adjacent to said cutting devices, carriages supporting said cutting devices and operative by said traveling carriages, cam mechanism for turning said wood heel blank to present different portions thereof to the respective cutting devices during movement of said carriages, and means for moving the cutting devices about their pivots during operation thereof to form an outer wall on said heel blank having all portions differing in curvature from adjacent portions.

61. In a machine of the character described, a traveling carriage for supporting a wood heel blank, cams for turning the wood heel blank supported by said carriage, and a series of pivoted cutting devices controlled by said carriage to cut respectively different portions of an outer wall on said heel blank having every portion thereof differing in curvature from adjacent portions.

62. In a machine of the character described, a traveling carriage for supporting a wood heel blank, a series of pivoted cutters for cutting a curved outer wall on said blank, cam mechanism for turning the wood heel blank to present different portions thereof to the respective cutters, and means operated by said carriage for moving the respective cutters during operation thereof on the wood heel blank to form respectively different portions of an outer wall having adjacent portions differing in curvature.

63. In a machine of the character described, a traveling carriage for supporting a wood heel blank, movable carriages, pivoted cutters supported in said movable carriages respectively, mechanism for moving the wood heel blank to present different portions thereof to the respective cutters, mechanism for moving said movable carriages in unison with said traveling carriage during operation of the cutters on the wood heel blank, and mechanism for moving the pivoted cutters to position to cut a curved wall having adjacent portions of different curvature.

64. In a machine of the character described, a traveling carriage for supporting a wood heel blank, movable carriages, pivoted cutters supported in said movable carriages respectively, mechanism for moving the wood heel blank to present different portions thereof to the respective cutters, mechanism for moving said movable carriages in unison with said traveling carriage during operation of the cutters on the wood heel blank, mechanism for moving the pivoted cutters to position to cut a curved wall having adjacent portions of different curvature, means for severing the top end portion of the heel blank, and means for discharging the heel blank from said traveling carriage.

65. A machine of the character described comprising a traveling carriage, movable carriages, pivoted cutters operatively supported by said movable carriages respectively, means for supporting and turning a wood heel blank in said traveling carriage to present different portions of said blank to the respective cutters, means for moving said movable carriages in unison with said traveling carriage, and means for controlling said pivoted cutters to cut walls of different curvature on the wood heel blank.

66. In a machine of the character described, a traveling carriage for supporting a wood heel blank, cutters for forming the breast and outer walls of a heel during movement of said carriage, movable carriages supporting said cutters, cam mechanism for turning said heel blank to present different portions thereof to the respective cutters, and devices for controlling the pivoted cutters to cause each thereof to cut a curved wall having adjacent portions of different curvature.

67. In a machine of the character described, a traveling carriage for supporting a wood heel blank, mechanisms for cutting said blank optionally to form completely selected types and shapes of heels while said carriage is traveling, and means for operating said mechanisms selectively.

68. In a machine of the character described, a traveling carriage for supporting a wood heel blank, and a series of cutters operating automatically to cut said blank to form the complete breast wall and thereafter the complete curved outer wall of a heel while said carriage is traveling.

69. In a machine of the character described, a traveling carriage for supporting a wood heel blank, cutters operable optionally and selectively to cut the blank to form an inwardly curved wall or plain wall across one side of the blank while the carriage is traveling as desired, and other cutters operating to form the complete curved outer wall after said curved or said plain wall has been formed.

70. In a machine of the character described, a traveling carriage for supporting a wood heel blank, cutters operable optionally and selectively to cut the blank to form an inwardly curved wall or plain wall across one side of the blank while the carriage is traveling as desired, and a series of cutters operating automatically to cut the outer curved wall of the heel during continuous traveling of said carriage.

71. In a machine of the character described, a movable support for carrying a wood heel blank, mechanism for moving said support continuously at approximately uniform speed, and a series of cutters mounted on opposite sides of the line of movement of said support operating automatically to cut different walls on the wood heel blank to form a wood heel while said support is moving.

72. In a machine of the character described, a movable support for carrying a wood heel blank, mechanism for moving said support, a series of cutters operating automatically to cut different walls on the wood heel blank to form a wood heel while said support is moving, and means for moving certain of said cutters in unison with said support for a predetermined distance and time.

73. In a machine of the character described, a movable support for supporting a wood heel blank, a pair of cutters, one of which is optionally operable to cut a curved breast wall on said blank and the other of which is optionally operable to cut a breast wall of different form on said blank, and a series of cutters operable on either of said blanks to cut a curved outer wall intersecting said breast wall.

74. In a machine of the character described, a movable support having a uniform rate of movement for supporting a wood heel blank, and a series of mechanisms mounted on opposite sides of the line of movement of said support operating automatically to cut said blank to form heel walls during continuous uniform movement of said support.

75. In a machine of the character described, a support having a uniform rate of movement for supporting a wood heel blank, a series of spaced cutters operating automatically during uniform movement of said support to cut heel breast and outer walls on the blank mounted in said support, and mechanism for controlling said cutters to form variously curved walls on said blank.

76. In a machine of the character described, a support for supporting a wood heel blank, a series of spaced cutters operating automatically during movement of said support to cut heel walls on the blank mounted in said support, mechanism for controlling said cutters to form variously curved walls on said blank, and means for severing the top end portion of the blank.

77. In a machine of the character described, the combination of a continuously movable jack having a uniform rate of movement for carrying a wood heel blank, and a series of cutters performing numerous cutting operations on the blank while said blank is mounted in said jack to form a finished wood heel during uniform movement of said jack.

78. In a machine of the character described, a continuously moving jack for supporting a wood heel blank, and a series of cutters operating to perform a number of wall forming operations around the outer surface and across the breast of the blank during movement of the blank.

79. In a machine of the character described, a continuously moving jack having a uniform rate of movement for supporting a wood heel blank, a series of cutters operating to perform a number of wall forming operations on the blank during uniform movement of the blank, and means for moving certain of said cutters in unison with the blank to form variously curved walls.

80. The combination with a continuously moving jack having a uniform rate of movement for supporting a wood heel blank, of a series of cutters performing successively a number of wall forming operations around the outer surface and across the breast of the blank during uniform movement of the blank.

81. The combination with a continuously moving jack for a wood heel blank, of a series of cutters performing successively a number of wall forming operations around the outer surface and across the breast of the blank during movement of the blank and while said blank is secured in a single position in said jack.

82. The combination with a continuously moving jack having a uniform rate of movement for supporting a wood heel blank, of a series of cutters performing successively a number of wall forming operations on the blank during uniform movement of the blank and while said blank is secured in a single position in said jack, and means for moving certain of said cutters in unison with the jack and the blank and causing said cutters to form variously curved walls on the blank.

83. The combination with a continuously moving jack for a wood heel blank, of a series of cutters performing successively a number of wall forming operations around the blank during movement of the blank, and cam devices for turning the blank to present different portions thereof to said cutters during movement of the blank.

84. The combination with a continuously moving jack for a wood heel blank, of a series of cutters performing successively a number of wall forming operations around the blank during movement of the blank and while said blank is secured in a single position in said jack, and cam devices for turning the jack to present different portions of the surfaces of the heel blank to the different cutters during movement of the jack.

85. In a machine of the character described, a continuously moving jack for supporting a wood heel blank, a series of cutters operating to perform a series of wall forming operations around the blank during movement of the blank, rigid cams, and means controlled by said cams for moving said jack to different adjusted positions to present different portions of the heel blank to the respective cutters.

86. The combination with a continuously moving jack for supporting a wood heel blank, of a series of carriages, a cutting device mounted in each of said carriages and said cutting devices operating to perform successively a number of wall forming operations on the blank during movement of the blank, and cam mechanism for turning said jack to present different portions of the wood heel blank to different cutters.

87. The combination with a continuously moving jack for supporting a wood heel blank, of a series of carriages, a cutting device mounted in each of said carriages and said cutting devices operating to perform successively a number of wall forming operations on the blank during movement of the blank, cam mechanism for turning said jack to present different portions of the wood heel blank to different cutters, and means for moving said carriages and thereby said cutters in accompaniment with said jack.

88. The combination with a continuously moving jack for supporting a wood heel blank, of a series of cutters movable from starting positions in accompaniment with said jack and movable to said starting positions during continued movement of said jack, and mechanism for turning said jack to present different portions of the wood heel blank to different cutters during continuous movement of said jack.

89. The combination with a continuously moving jack for supporting and turning to different positions a wood heel blank, of a series of cutters performing successively a number of wall forming operations on the blank during continuous movement of the blank, and mechanism for turning said jack to present different portions of the wood heel blank to different cutters during continuous movement of said jack and said blank.

90. The combination with a continuous moving jack for supporting and turning to different positions a wood heel blank, of a series of cutters performing successively a number of wall forming operations on the blank during continuous movement of the blank, mechanism for turning said jack to present different portions of the wood heel blank to different cutters during continuous movement of said jack and said blank, and means for moving certain of said cutters along with said jack from starting positions and returning said cutters to said starting positions during continuous movement of said jack.

91. In a machine of the character described, a movable carriage for supporting a wood heel blank, a pivoted cutting device, and mechanisms cooperating and timed to move said carriage continuously and during such continuous movement to present different portions of the heel blank supported by said carriage to said cutting device to cut an outer wall of different curvature on said blank while said carriage is moving.

92. In a machine of the character described, a movable carriage for supporting a wood heel blank, a movable cutting device, mechanisms cooperating and timed to move said carriage continuously and to present different portions of the heel blank to said cutting device during movement of said carriage, and means for moving said cutting device along with said carriage during the time that said cutting device is operating on said blank and during the time that different portions of the blank are presented to the cutting device.

93. In a machine of the character described, a movable carriage for supporting a wood heel blank, a movable cutting device, mechanisms cooperating and timed to move said carriage continuously and to present different portions of the heel blank to said cutting device during movement of said carriage, means for moving said cutting device along with said carriage during the time that said cutting device is operating on said blank and during the time that different portions of the blank are presented to the cutting device, a pivotal support for said cutting device, and means for moving said cutting device about said support during operation of said cutting device on the heel blank and during movement of the cutting device along with said carriage.

94. In a machine of the character described, a traveling carriage for supporting a wood heel blank, cutters operable to cut the blank to form all walls of a finished heel other than the end walls, and mechanisms for moving said carriage continuously and for operating said cutters to cut said blank during continuous movement of said carriage to form the complete outer walls of a finished heel during said continuous movement of said carriage and movement of said cutters.

95. In a machine of the character described, a traveling carriage for supporting a wood heel blank, and mechanisms movable along with said carriage to cut said blank to form the outer wall of selected types and shapes of heels during movement of said carriage and said mechanisms as aforesaid.

96. In a machine of the character described, a traveling carriage for supporting a wood heel blank, mechanism for moving said carriage continuously at approximately uniform speed, and mechanisms movable along with said carriage to cut said blank to form the outer walls of a heel during movement of said carriage and said mechanisms as aforesaid.

97. In a machine of the character described, a traveling carriage for supporting a wood heel blank, mechanism for moving said carriage continuously, mechanism movable along with said carriage to cut said blank to form the outer walls of heels during continuous movement of said carriage and during movement of said mechanisms with said carriage as aforesaid, and means for turning said wood heel blank to present different portions thereof to said cutting mechanisms.

98. In a machine of the character described, a traveling carriage for supporting a wood heel blank, mechanism for moving said carriage continuously, mechanism movable along with said carriage to cut said blank to form the outer walls of heels during continuous movement of said carriage and during movement of said mechanisms with said carriage as aforesaid, and means for turning said wood heel blank to present different portions thereof to said cutting mechanisms during continuous movement of said carriage and during the time that said cutting mechanisms are operating on said blank.

99. In a machine of the character described, a movable support for carrying a wood heel blank, mechanism for moving said support, a series of cutters mounted on opposite sides of the line of movement of said support operating automatically to cut different walls on the wood heel while said support is moving, and means for turning said wood heel blank relative to said cutters during movement of said support and during operation of said cutters on said blank.

100. In a machine of the character described, a carriage, mechanism for moving said carriage continuously at approximately uniform speed, jack elements for holding a wood heel blank in said carriage, and mechanism for severing one end of said wood heel blank transversely of the vertical axis thereof.

101. In a machine of the character described, a continuously moving jack for supporting a wood heel blank, and mechanism for completely severing the lift attaching end of said blank during movement of said jack.

102. In a machine of the character described, a continuously moving jack for supporting a wood heel blank, mechanisms for forming the outer walls of a heel other than the breast wall thereof during continuous movement of said jack, and mechanism for severing one end of said heel.

103. In a machine of the character described, mechanism for supporting and moving a wood heel blank at approximately uniform speed, and a series of cutters mounted on opposite sides of the line of movement of said blank operating automatically to cut different walls on the wood heel blank to form a wood heel while said mechanism is moving as aforesaid.

104. In a machine of the character described, mechanism for supporting and moving a wood heel blank at approximately uniform speed, a series of cutters mounted on opposite sides of the line of movement of said blank operating automatically to cut different walls on the wood heel blank to form a wood heel while said mechanism is moving as aforesaid, and mechanism for severing one end of the wood heel after said walls have been formed.

105. In a machine of the character described, a movable support for carrying a wood heel blank, a series of cutters operating to cut different outer curved walls of the wood heel blank during movement of said support, and means for severing one end of the wood heel blank.

106. A machine of the character described comprising a movable support for carrying a wood heel blank, a cutter for operating on the blank carried by said support, and mechanism for moving said cutter along with said support during operation of said cutter on said blank.

107. A machine of the character described comprising a movable support for carrying a wood heel blank, a cutter for operating on the blank carried by said support, and mechanism for moving said cutter along with said support during operation of said cutter on said blank and then returning said cutter to starting position preparatory for operation on another blank.

108. A machine of the character described comprising a jack for supporting a wood heel blank, and mechanisms for cutting said blank to form first the breast wall of the heel and then successively to form the outer wall of the heel at opposite sides thereof.

109. A machine of the character described comprising a jack for supporting a wood heel blank, and mechanisms for cutting said blank to form first the breast wall of the heel and then successively to form the outer wall of the heel at opposite sides thereof during continuous movement of said jack.

110. A machine of the character described comprising a jack for supporting a wood heel blank, mechanisms for cutting said blank to form first the breast wall of the heel and then successively to form the outer wall of the heel at opposite sides thereof during continuous movement of said jack, and means for turning said blank to present different portions of the heel blank to said mechanisms to form said walls as aforesaid.

ANDREW F. HOWE.